(12) United States Patent
Egranov et al.

(10) Patent No.: US 12,536,306 B2
(45) Date of Patent: Jan. 27, 2026

(54) SYSTEM, DEVICES AND/OR PROCESSES FOR SYSTEM OWNERSHIP CHANGE EVENT

(71) Applicant: Arm Limited, Cambridge (GB)

(72) Inventors: Daniil Viktorovich Egranov, Houston, TX (US); Donald Edward Banks, San Jose, CA (US)

(73) Assignee: Arm Limited, Cambridge (GB)

(*) Notice: Subject to any disclaimer, the term of this patent is extended or adjusted under 35 U.S.C. 154(b) by 637 days.

(21) Appl. No.: 17/511,387

(22) Filed: Oct. 26, 2021

(65) Prior Publication Data

US 2022/0058275 A1 Feb. 24, 2022

Related U.S. Application Data

(63) Continuation-in-part of application No. 17/000,148, filed on Aug. 21, 2020, now Pat. No. 11,831,406.

(51) Int. Cl.
| | |
|---|---|
| *G06F 21/60* | (2013.01) |
| *G06F 21/10* | (2013.01) |
| *G06F 21/57* | (2013.01) |
| *G06F 21/78* | (2013.01) |
| *H04L 9/08* | (2006.01) |

(52) U.S. Cl.
CPC .......... *G06F 21/604* (2013.01); *G06F 21/57* (2013.01); *G06F 21/602* (2013.01); *G06F 21/78* (2013.01); *H04L 9/0891* (2013.01); *G06F 21/107* (2023.08); *G06F 2221/2143* (2013.01)

(58) Field of Classification Search
CPC ...... G06F 21/604; G06F 21/57; G06F 21/602; G06F 21/78; G06F 21/107; G06F 2221/2143; H04L 9/0891

USPC .......................................................... 380/30
See application file for complete search history.

(56) References Cited

U.S. PATENT DOCUMENTS

| | | | |
|---|---|---|---|
| 10,044,514 B1* | 8/2018 | Peterson | H04L 9/0894 |
| 10,146,932 B2 | 12/2018 | Birgisson | |
| 10,673,638 B2* | 6/2020 | Gulati | G06F 21/572 |
| 2006/0137007 A1 | 6/2006 | Paatero | |
| 2011/0307712 A1 | 12/2011 | Sakthikumar | |
| 2017/0046513 A1 | 2/2017 | Mcgovern | |
| 2018/0004953 A1 | 1/2018 | Smith, II et al. | |
| 2018/0137284 A1 | 5/2018 | Oh et al. | |
| 2018/0375665 A1* | 12/2018 | Contenti | G01G 19/44 |
| 2019/0080299 A1 | 3/2019 | Thom et al. | |
| 2019/0149558 A1* | 5/2019 | Phan | H04W 12/126 |
| | | | 713/164 |
| 2019/0163910 A1 | 5/2019 | Moon et al. | |
| 2020/0097658 A1 | 3/2020 | Samuel et al. | |

(Continued)

OTHER PUBLICATIONS

Arm Limited, "ARM Trusted Firmware Design," Copyright 2013-2014, https://chromium.googlesource.com/external/github.com/ARM-software/arm-trusted-firmware/+/v0.4-rc1/docs/firmware-design.md, 19 Pages.

(Continued)

*Primary Examiner* — Moeen Khan
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more processing devices to facilitate and/or support system ownership change event for one or more computing devices.

14 Claims, 22 Drawing Sheets

(56) References Cited

U.S. PATENT DOCUMENTS

| | | | |
|---|---|---|---|
| 2020/0151335 A1 | 5/2020 | Ayoub et al. | |
| 2020/0296088 A1* | 9/2020 | Brown | H04L 67/51 |
| 2021/0012008 A1 | 1/2021 | Kim | |
| 2021/0150527 A1* | 5/2021 | Ur | H04L 9/3239 |
| 2021/0357198 A1 | 11/2021 | Cherches | |
| 2021/0406379 A1* | 12/2021 | Lee | G06F 21/572 |

OTHER PUBLICATIONS

Palmer, "Ownership and Control of Firmware in Open Compute Project Devices," Nov. 9, 2018, https://duckduckgo.com/?q=Ownership+and+Control+of+Firmware+in+Open+Compute+Project+Devices&atb=v236-1&ia=web, 8 Pages.

Barker, "Recommendation for Key Management," NIST Special Publication 800-57 Part 3 Revision 1, http://dx.doi.org/10.6028/NIST.SP.800-57pt3r1, 102 Pages.

Office Action, U.S. Appl. No. 17/000,148, Mailed Jan. 6, 2022, 18 pages.

Response to Office Action, U.S. Appl. No. 17/000,148, filed Apr. 5, 2022, 24 pages.

Final Office Action, U.S. Appl. No. 17/000,148, Mailed Apr. 28, 2022, 19 pages.

Response to Final Office Action, U.S. Appl. No. 17/000,148, filed Jun. 28, 2022, 26 pages.

Advisory Action, U.S. Appl. No. 17/000,148, Mailed Aug. 5, 2022, 7 pages.

Response to Advisory Action (RCE), U.S. Appl. No. 17/000,148, filed Aug. 29, 2022, 30 pages.

Office Action, U.S. Appl. No. 17/000,148, Mailed Sep. 19, 2022, 27 pages.

Response to Office Action, U.S. Appl. No. 17/000,148, filed Dec. 19, 2022, 20 pages.

Final Office Action, U.S. Appl. No. 17/000,148, Mailed Jan. 4, 2023, 29 pages.

Response to Final Office Action, U.S. Appl. No. 17/000,148, filed Mar. 2, 2023, 23 pages.

Advisory Action, U.S. Appl. No. 17/000,148, Mailed Mar. 20, 2023, 7 pages.

Response to Advisory Action (RCE), U.S. Appl. No. 17/000,148, filed Apr. 4, 2023, 28 pages.

Supplemental Amendment, U.S. Appl. No. 17/000,148, filed Jun. 7, 2023, 20 pages.

Notice of Allowance, U.S. Appl. No. 17/000,148, Mailed Jun. 27, 2023, 13 pages.

Issue Fee, U.S. Appl. No. 17/000,148, filed Sep. 26, 2023, 8 pages.

Issue Notification, U.S. Appl. No. 17/000,148, filed Nov. 8, 2023, 2 pages.

Office Action, U.S. Appl. No. 17/511,360, Mailed Apr. 30, 2024, 12 pages.

Response to Office Action, U.S. Appl. No. 17/511,360, filed Jul. 30, 2024, 18 pages.

Final Office Action, U.S. Appl. No. 17/511,360, Mailed Aug. 20, 2024, 16 pages.

Response to Final Office Action, U.S. Appl. No. 17/511,360, filed Oct. 21, 2024, 20 pages.

Advisory Action, U.S. Appl. No. 17/511,360, Mailed Nov. 12, 2024, 5 pages.

Response to Advisory Action (RCE), U.S. Appl. No. 17/511,360, filed Dec. 17, 2024, 25 pages.

Office Action, U.S. Appl. No. 17/511,360, Mailed Feb. 12, 2025, 19 pages.

Response to Office Action, U.S. Appl. No. 17/511,360, filed May 12, 2025, 16 pages.

Final Office Action, U.S. Appl. No. 17/511,360, Mailed Jul. 14, 2025, 26 pages.

Advisory Action, U.S. Appl. No. 17/511,360, Mailed Sep. 19, 2025, 4 pages.

RCE, U.S. Appl. No. 17/511,360, filed Oct. 14, 2025, 21 pages.

Office Action, U.S. Appl. No. 17/511,360, Mailed Dec. 3, 2025, 23 pages.

* cited by examiner

SYSTEM, DEVICES AND/OR PROCESSES FOR SYSTEM OWNERSHIP CHANGE EVENT

This application is a continuation-in-part to U.S. patent application Ser. No. 17/000,148, titled "SYSTEM, DEVICES AND/OR PROCESSES FOR SECURE TRANSFER OF CRYPTOGRAPHICAL CONTROL OF COMPUTING PLATFORM," filed on Aug. 21, 2020, incorporated herein by reference in its entirety.

BACKGROUND

Field

The present disclosure relates generally to systems, devices and/or processes for system ownership change event for one or more computing devices.

Information

Many electronic devices, such as any of a wide range of computing device types, may operate, at least in part, in accordance with some form of executable computer program code, such as firmware, that may be stored in a portion of non-volatile memory, for example. Also, in many electronic devices, cryptographic techniques may be implemented to verify authenticity of device firmware and/or to protect firmware from unauthorized access and/or modification, for example. In many electronic devices, protected storage may be used to store confidential content, such as cryptographic keys, for example, that may only be accessed in accordance with a suitable authorization scheme. As computing devices continue to gain wider and wider use for an ever-growing variety of purposes and/or applications, it may be advantageous to further develop techniques to secure device firmware and/or to securely transfer ownership control of computing devices from current owners to new owners, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
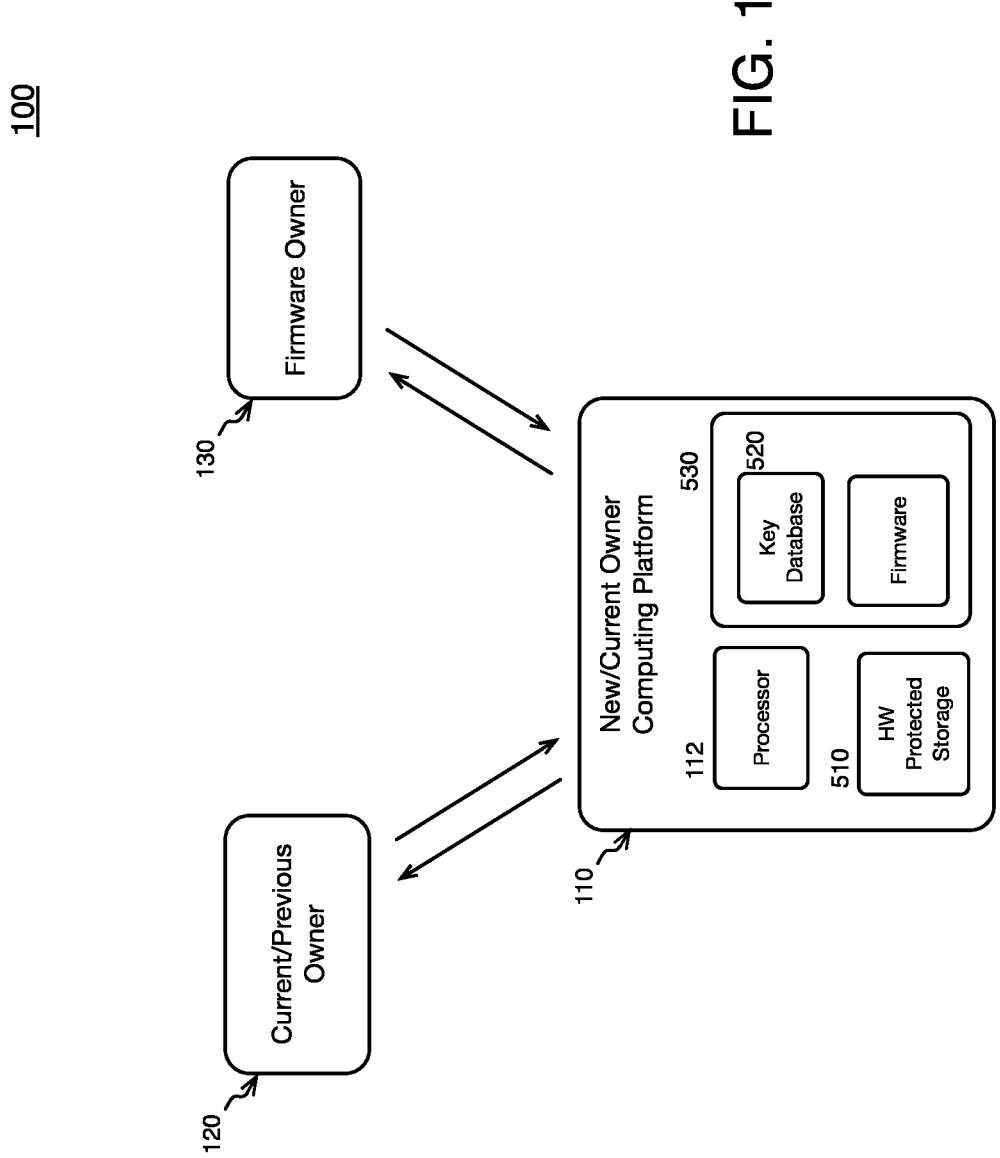
FIG. 1 is a schematic diagram of an example computing environment in accordance with embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, many electronic devices, such as any of a wide range of computing device types, may operate, at least in part, in accordance with some form of executable computer program code, such as firmware, that may be stored in a portion of non-volatile memory, for example. Also, in many electronic devices, cryptographic techniques may be implemented to verify authenticity of device firmware and/or to protect firmware from unauthorized access and/or modification, for example. In many electronic devices, protected storage may be used to store confidential content, such as cryptographic keys, for example, that may only be accessed in accordance with a suitable authorization scheme. As computing devices continue to gain wider and wider use for an ever-growing variety of purposes and/or applications, it may be advantageous to further develop techniques to secure device firmware and/or to securely transfer control of computing devices from previous owners to new owners, for example.

In some circumstances, a computing device may change hands one or more times during the operating life of the computing device. For example, an entity (e.g., individual, company, organization, etc.) may purchase or otherwise obtain, directly or indirectly, a computing platform (e.g., one or more computing devices) from an original equipment manufacturer (OEM) and/or Original Design Manufacturer (ODM) and/or from another entity. Oftentimes, a computing platform obtained from an OEM/ODM or other entity may have installed thereon particular content, such as firmware, key material, device identification, etc., installed by an OEM/ODM. In some circumstances, OEMs/ODMs may not wish to manage firmware for computing platforms subsequent to computing platforms being obtained by subsequent system owners. Also, in some circumstances, entities obtaining computing platforms from an OEM/ODM and/or from other entities may desire to install new and/or additional firmware. Further, in some circumstances, a system owner may find it advantageous to control system firmware, such as, for example, allowing or disallowing firmware from particular firmware vendors.

To address such challenges, at least in part, example embodiments disclosed herein may include separating computing system/device/platform ownership from firmware ownership. "Ownership," "owner" and/or the like in this context refers to cryptographic control, as explained more fully below. In example embodiments, a chain of provenance may be cryptographically established for particular computing platforms, as explained more fully below. Further, in example embodiments, a chain-of-trust between a particular computing device/system/platform owner and one or more firmware signing domains may be protected and/or verified, as also explained more fully below.

Example embodiments, as explained more fully below, may include allowing a new system owner to obtain full and/or partial control of firmware for a particular computing platform (e.g., one or more particular computing devices). Further, in embodiments, a new system owner may generate and/or otherwise obtain a new system owner root-of-trust public key (ROTPK) and/or may provision a current platform ROTPK with the new system owner ROTPK to execute, at least in part, a secure transfer of ownership (e.g., cryptographically controlled) for a particular computing platform. "ROTPK" and/or the like refers to a public part of an asymmetric pair of cryptographic keys that may be utilized in connection with execution of particular boot ROM code, for example, to establish a node of a computing platform's chain of trust. "Platform ROTPK" and/or the like refers to a public part of an asymmetric pair of keys that may be used for validating a computing platform's firmware and/or other digital content. "System owner" and/or the like refers to an individual person, organization, representative, etc. who exercises control over and/or otherwise is allowed access to a private key associated with a particular platform ROTPK. At times, it may be convenient to refer herein to an ownership entity having previously transitioned away from having cryptographic control of a particular computing device as a "previous" system owner and/or to refer herein to an ownership entity having transitioned to cryptographic control of the particular computing device as being a "current" system owner. Further, an ownership entity in the process of transitioning to cryptographic control of a particular computing device may be referred to as a "new" system owner. Further, it may be noted that the term "new system owner" and/or the like may be indicative of a transitory state for a system owner. For example, once a new system owner's (e.g., owner "B") platform ROTPK is signed by a current system owner's (e.g., owner "A") platform ROTPK and is provisioned as a platform ROTPK, the current system owner (owner A) may be referred to as a "previous" system owner and the new system owner (owner B) may be referred to as the "current" system owner.

Also, in embodiments, a current system owner may add and/or remove firmware owners to and/or from a particular computing platform's authorized list of signing domains (i.e., multiple signing domain support), as explained more fully below. "Firmware owner" and/or the like refers to an individual person, organization, representative, etc. who may exercise control over and/or may otherwise be allowed to access a private part of a pair of asymmetric keys for a particular firmware owner that may be used to sign firmware. "Firmware ROTPK" refers to a public part of a pair of asymmetric keys that may be utilized for validating platform firmware.

FIG. 1 is a schematic diagram of an example embodiment 100 of computing environment in accordance with embodiments. Example environment 100 may include a new/current system owner computing platform 110 which may comprise, for example, one or more computing devices. In a particular implementation, computing platform 110 may include at least one processor 112, a hardware-protected storage device 510, and a non-volatile memory device 530. In an implementation, non-volatile memory device 530 may store system firmware and may also store a key database 520, explained more fully below. Example environment 100 may also include a current/previous system owner computing device 120, which may comprise and OEM/ODM computing device, for example, and/or a firmware owner computing device 130. Example communications among computing platform 110, computing device 120 and/or firmware owner computing device 130 in accordance with particular implementations of example embodiments are described more fully below. In at least some aspects, computing devices 110, 120 and/or 130 may share characteristics with example computing device 1804 depicted in FIG. 18 and as described below.

In an implementation, communication of signals and/or signal packets among computing platform 110, computing device 120 and/or firmware owner computing device 130 may be established and/or maintained in accordance with any of a wide range of possible technologies, standards, protocols, etc., such as example technologies, standards, protocols, etc. described below. In a particular implementation, communication of signals and/or signal packets among computing platform 110, computing device 120 and/or firmware owner computing device 130 may be established and/or maintained at least in part via a transport layer infrastructure (e.g., TCP/IP) suitable for an exchange of messages between and/or among computing platform 110, computing device 120 and/or firmware owner computing device 130 using communication formats according to higher levels of abstraction (e.g., HTTP, MQTT, CoAP, LoRa, WiSUN, Zigbee, etc.). According to an embodiment, computing platform 110 may be capable of establishing a secure exchange of messages with computing device 120 and/or firmware owner computing device 130 over a transportation layer infrastructure established and/or maintained via a particular cryptographic communication protocol such as, for example, transport layer security (TLS).

In embodiments, computing platform 110 may execute code that may implement a set of functions to allow a user to initiate one or more operations and/or services described herein. In a particular implementation, computing device 110 may execute a software and/or firmware agent, such as a firmware management service and/or a trust authority service programming interface (API) and/or other API, for example, that may allow a user to initiate transfer of cryptographic control of computing platform 110 to a subsequent ownership entity (e.g., obtain signed cryptographic keys from a current system owner to establish subsequent ownership, logically replace platform ROTPK with new system owner ROTPK to establish new system owner ROTPK as current platform ROTPK, etc.) and/or to manage platform firmware, for example.

Figure 2:
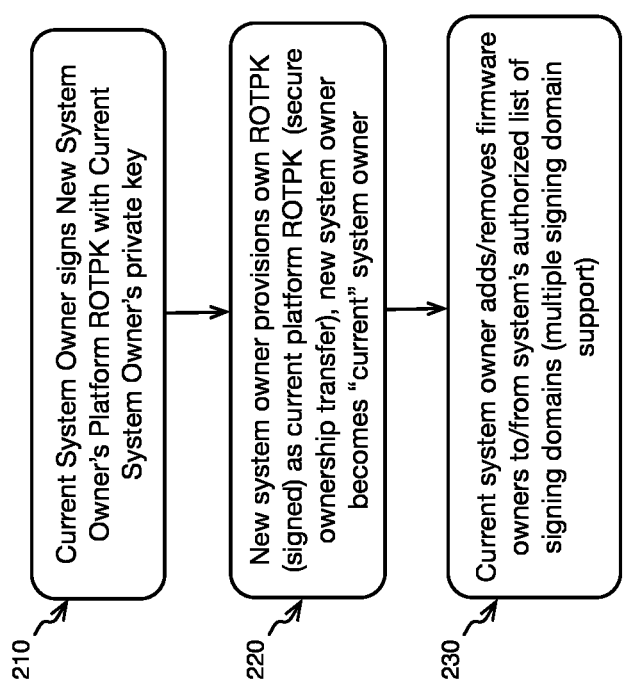
FIG. 2 is a flow diagram illustrating an example process for transferring cryptographic control of a computing platform from a particular entity to a new entity, in accordance with embodiments.

FIG. 2 is a flow diagram illustrating an embodiment 200 of an example process for transferring cryptographic control of a computing platform, such as computing platform 110, from a particular ownership entity to a subsequent ownership entity. Embodiments in accordance with claimed subject matter may include all of blocks 210-230, fewer than blocks 210-230, and/or more than blocks 210-230. Likewise, it should be noted that content acquired or produced, such as, for example, input signals, output signals, operations, results, etc. associated with example embodiment 200 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

In a particular implementation, an individual and/or other entity (e.g., business, organization, association, partnership, representative, etc.) may obtain, such as via purchase and/or lease, a computing platform, such as computing platform 110, from an individual and/or entity (e.g., OEM/ODM). In a particular implementation, to securely transfer control (e.g., transfer cryptographical control) of computing platform 110, for example, from a current system owner (e.g., OEM/ODM) to a new system owner, a new system owner may provision a current platform ROTPK with the new system owner's own ROTPK as depicted, for example, at blocks 210 and 220. In an implementation, a current system owner may sign the new system owner's ROTPK with the current system owner's private key, as depicted in block 210, and the new system owner may provision the signed new system owner's ROTPK as the current platform ROTPK, as depicted at block 220, at which point the current system owner may be referred to as a previous system owner and the new system owner may be referred to as the current system owner. As discussed more fully below, to provision the signed new system owner ROTPK as the current platform ROTPK, the signed new system owner ROTPK may logically replace the current system owner ROTPK as platform ROTPK and/or the signed new system owner ROTPK may be physically added to the top of a list of platform ROTPKs, in an implementation. As mentioned, "ownership" of a particular computing platform in this context refers to cryptographic control of the particular computing platform. As also mentioned, "system owner" and/or the like refers to an individual person, organization, representative, etc. who exercises control over and/or otherwise is allowed access to a private part of a pair of asymmetric keys for a particular platform ROTPK. Thus, in an implementation, the individual and/or other entity to have obtained computing platform 110, for example, may become a current system owner in a cryptographical sense at least in part by logically replacing a current platform ROTPK with the individual's and/or other entity's own ROTPK, signed with the previous system owner's private key, as depicted at block 220. Replacing a platform ROTPK with a new system owner's ROPTK to implement a secure transfer of ownership for a particular computing platform may include accessing a key database in a trusted execution environment as explained more fully below. In an implementation, replacing a platform ROTPK with a new system owner's ROPTK may be initiated, at least in part, by a user interacting with an API executed by computing platform 110. Operations to provision a platform ROTPK with a new system owner's ROPTK may be executed by computing platform 110, in an implementation.

In a particular implementation, a current system owner may manage (e.g., via an API executed by computing platform 110) a list of firmware which may allowed to be installed and/or executed on a particular computing platform, such as computing platform 110. For example, controlling a platform ROTPK may allow a current system owner to control provisioning and/or revoking of firmware ROTPKs in computing platform 110. For example, as depicted at block 230, a current system owner may, via an API executed at computing platform 110, add and/or remove one or more firmware owners to and/or from a system's authorized list of signing domains. In this manner, multiple signing domains for system firmware may be supported. As mentioned, "firmware owner" and/or the like refers to an individual person, organization, representative, etc. who exercises control over and/or otherwise is allowed access to a private part of a pair of asymmetric keys for a particular firmware ROTPK. Also, as mentioned, "firmware ROTPK" refers to a public part of a pair of asymmetric keys that may be utilized in operations to validate platform firmware. In a particular implementation, multiple cryptograph signing domains may support secure operation of firmware from multiple different firmware owners, as explained more fully below.

In implementations, a system owner may or may not be an owner of a firmware ROTPK. From a system owner's perspective, a firmware owner may not be an organization or person who holds intellectual property rights to the firmware code but may rather be a person, organization, etc. who possesses and/or otherwise controls a private part of a firmware ROTPK which may be used to sign firmware. A firmware owner may or may not have rights to provision their firmware on a particular computing platform. For example, as mentioned, a system owner may determine what firmware may be provisioned for a particular computing platform. In an implementation, a firmware owner and a system owner may comprise the same entity or may comprise separate entities. In an implementation, only a single system owner can exist at any given time for a particular computing platform, and only a system owner can install, update and/or remove firmware keys.

Figure 3:
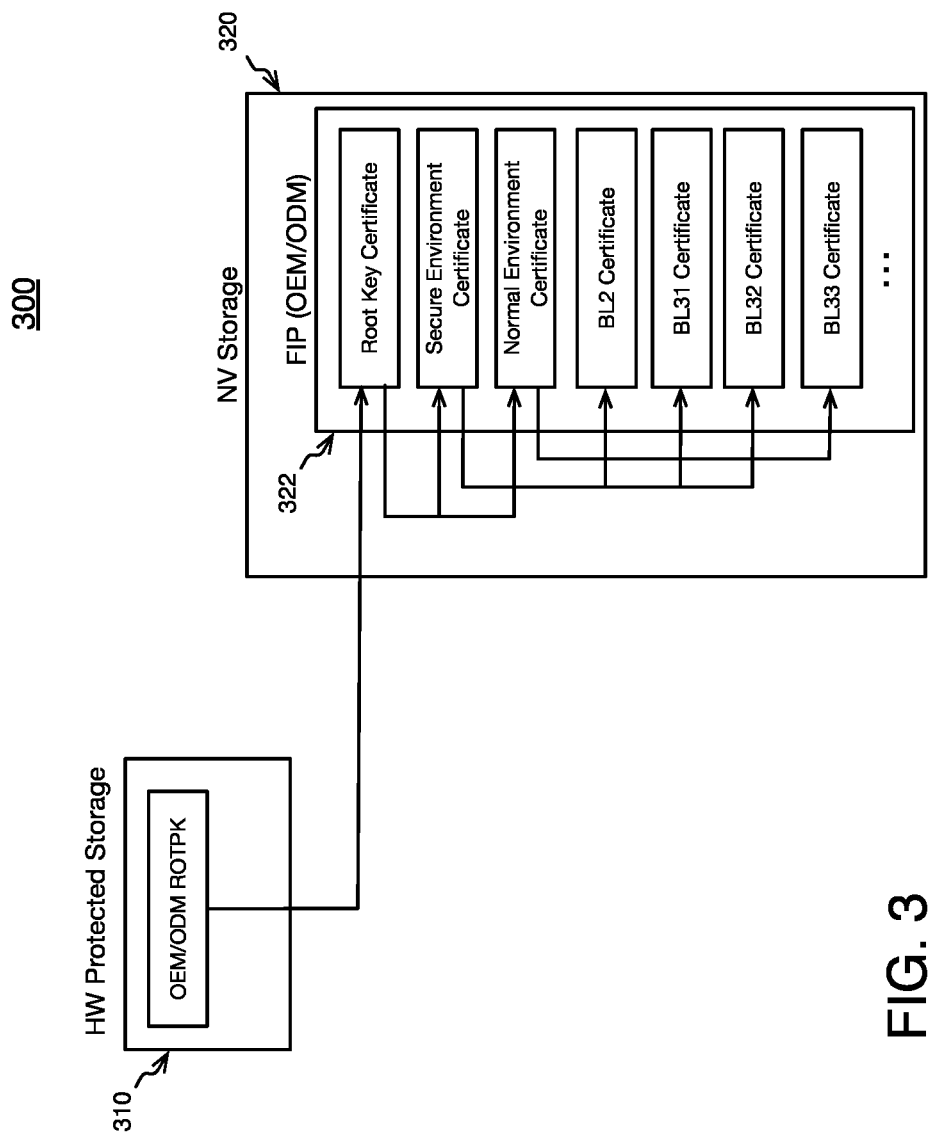
FIG. 3 is a schematic diagram depicting example firmware stored in non-volatile storage of an example computing device, in accordance with embodiments.

FIG. 3 is a schematic diagram depicting an example scheme 300 for managing firmware for some systems in which an OEM/ODM may exercise at least some control over system firmware. Example 300 depicts an example firmware image package (FIP) 322 stored in a non-volatile memory 320 for a particular computing device (not shown). In some circumstances, an OEM/ODM may retain full control of platform firmware and may not allow an end user and/or other entities to modify and/or replace firmware. To achieve and/or maintain control over platform firmware, an OEM/ODM may possess and/or otherwise control a platform ROTPK for a particular computing platform. For example, an OEM/ODM may provision a platform ROTPK to a hardware protected storage, such as hardware protected storage 310, during manufacturing and may not provide any mechanism for any reprovisioning of the platform ROTPK. Thus, the OEM/ODM remains the only entity having any control over firmware. In this manner, OEMs/ODMs may control who provides firmware for particular computing platforms. In some circumstances, for example, OEMs/ODMs may not allow custom or third-party firmware.

Further, in some circumstances, OEMs/ODMs may control firmware chain of certificates and/or signatures. For example, as depicted in example 300, a firmware root key certificate in FIP 322 may be signed by an OEM/ODM in accordance with the OEM/ODM ROTPK. In this circumstance, a root key certificate of FIP 322 signed by an OEM/ODM sits atop a chain of trust that may satisfy verified boot requirements, for example. However, in some circumstances, a company or other organization, for example, may desire to control platform firmware. For example, a company or other organization may desire to include additional functionality and/or features that may not exist in the original firmware provided by the OEM/ODM. Also, for example, a company or other organization may not fully trust OEM/ODM firmware due to particular security policies and/or concerns. Additionally, for example, a company or organization may wish to develop their own firmware for a particular computing platform. Because OEMs/ODMs may not provide any mechanism for other entities to control firmware, circumstances may arise wherein a chain of trust for firmware elements involved in a computing platform boot process may be broken.

Figure 4:
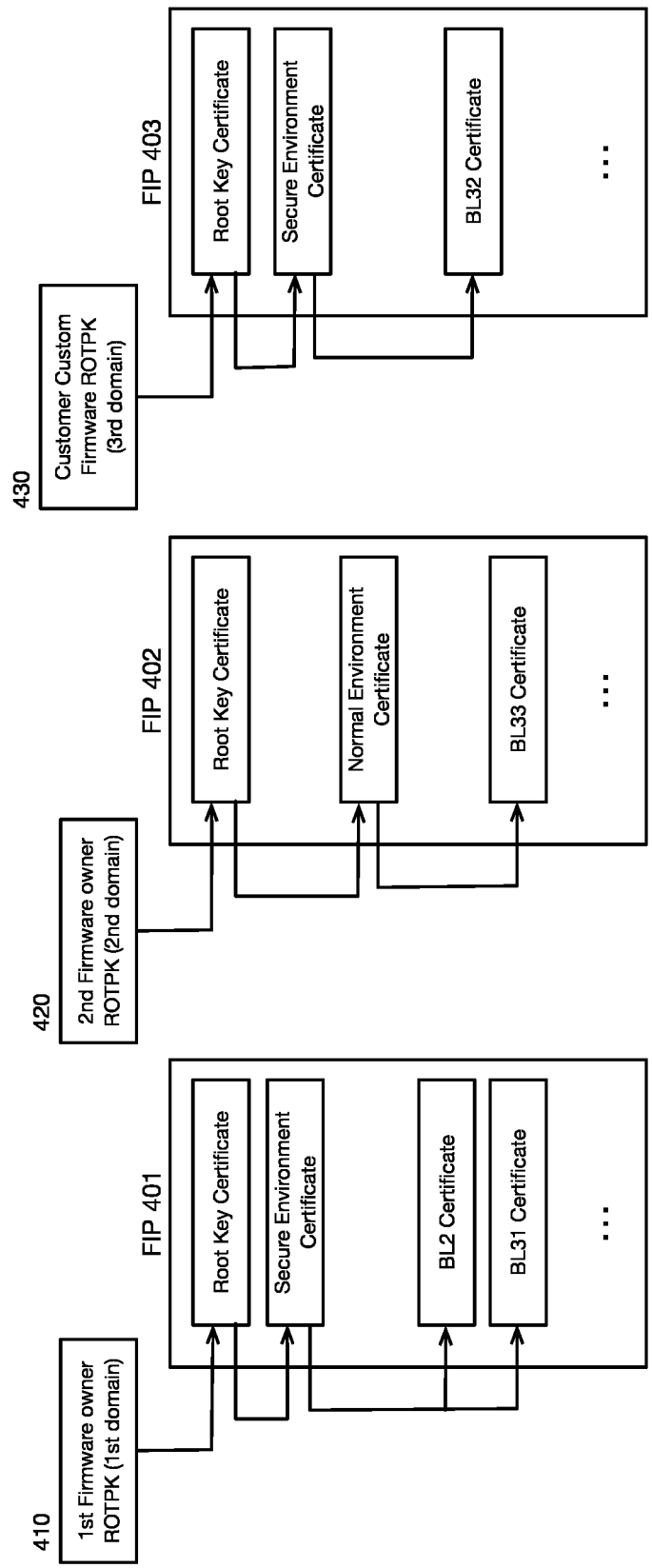
FIG. 4 is a schematic diagram illustrating example firmware image packages for an example computing device, in accordance with embodiments.

For example, FIG. 4 depicts an example 400 in which different firmware boot elements may be provided by different firmware vendors. For example, to satisfy verified computing platform boot operations, third-party and/or custom firmware may be signed. In circumstances in which an OEM/ODM refuses and/or is otherwise unable to cryptographically sign third-party and/or custom firmware certificates, independent firmware owners and/or custom "in house" firmware developers may sign their firmware with their respective private keys. These example circumstances may result in multiple signing domains which may exist independently one from another and/or which may not have a common firmware ROTPK. Example 400 depicts a first firmware vendor 410 using a first firmware owner ROTPK to sign a root key certificate for FIP 401, a second firmware vendor 430 using a second firmware owner ROTPK to sign a root key certificate for FIP 402, and a company and/or other organization's own firmware ROPTK to sign a root key certificate for custom FIP 403. In an implementation, computing platform 110 may obtain firmware and/or firmware ROTPKs from one or more firmware owner computing devices 130.

For the circumstances depicted in example 400, the multiple signing domains (e.g., individual FIPs signed by separate firmware ROTPKs) break the computing platform's chain of trust which is to begin from a computing platform's single ROTPK and go down through secure environment certificates, normal environment certificates, operating system certificates, etc. In circumstances such as depicted in example 400, multiple firmware ROTPKs on a particular computing platform may increase security risks and/or may create additional attack vectors on firmware integrity and/or authenticity.

As described herein, to address such issues, in accordance with embodiments, a system owner may determine which signing domain is allowed on a particular computing platform. In embodiments, one or more data structures may be maintained to define a chain of trust based on a single platform ROTPK. Also, in embodiments, firmware from multiple signing domains and/or a platform ROTPK may be protected against unauthorized modification.

Figure 5:
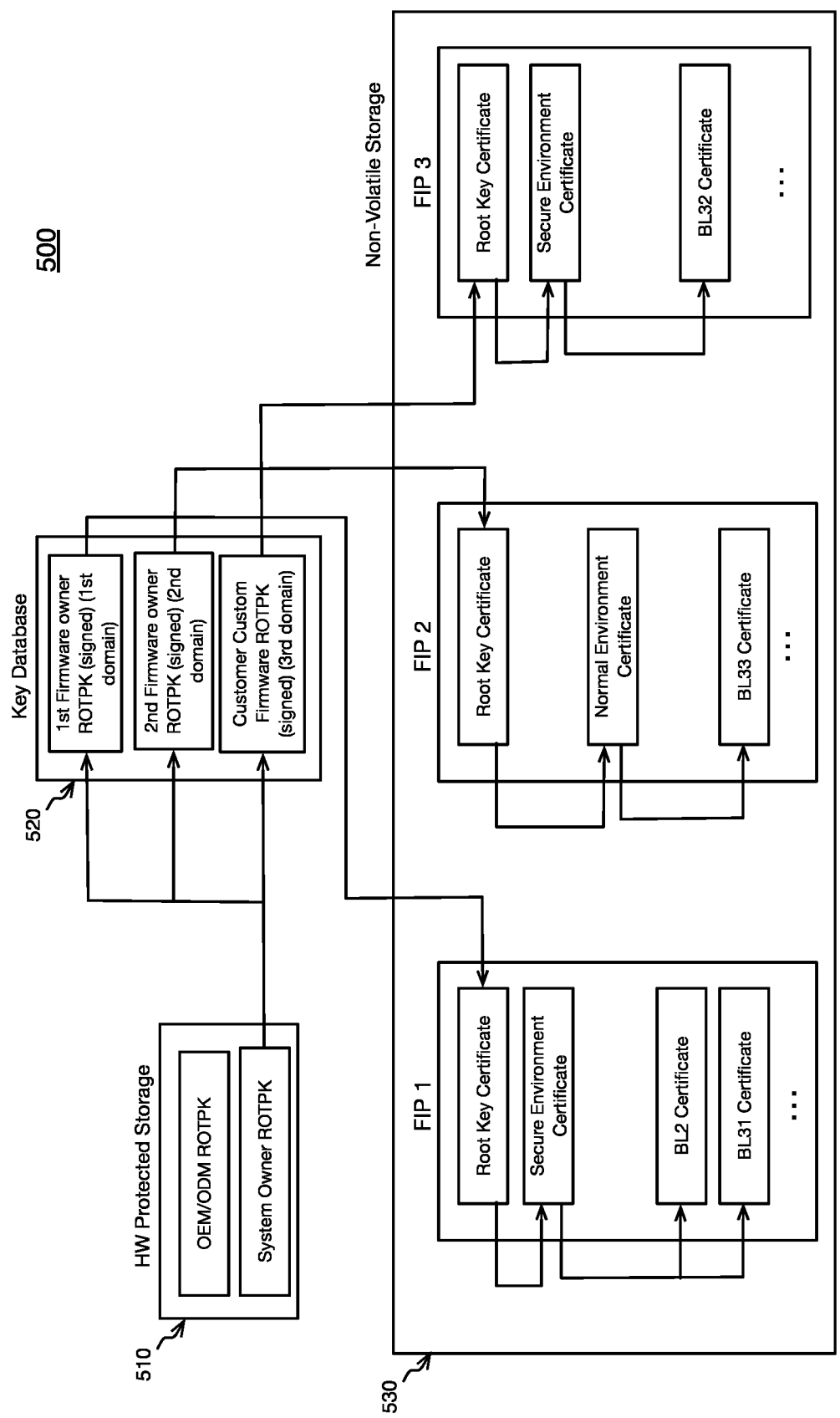
FIG. 5 is a schematic diagram depicting an example key database for an example computing device, in accordance with embodiments.

FIG. 5 is a schematic diagram of an example 500 depicting hardware protected storage 510 for example computing platform 110. Key database 520 for computing platform 110 is also depicted, along with non-volatile storage device 530. In an implementation, key database 520 may contain content (e.g., parameters, values, signals and/or states, etc.) pertaining to current and/or previous system owners. Further, key database 520 may contain firmware owner's ROTPKs signed by the current system owner, as mentioned.

Responsive at least in part to obtaining (e.g., buying, leasing, etc.) computing device 110 (sometimes referred to herein as a "system"), for example, an entity (e.g., individual, organization, representative, etc.) may seek to establish cryptographic and/or ownership control of the system. In an implementation, a particular ownership entity may, at least in part via an API executed at computing platform 110, provision a public part of a pair of cryptographic keys as a platform ROTPK in order to establish cryptographic control of platform firmware. As depicted within hardware protected storage 510, a list of system owner ROTPKs may include an OEM/ODM ROTPK representative of a previous system owner ROTPK and may also include an ROTPK for the particular ownership entity representative of a current system owner ROTPK. Having control of a platform ROTPK may allow a current system owner to create an uninterruptable chain of trust by signing firmware owner ROTPKs with the current system owner's private key (e.g., private part of a pair of cryptographic keys). For example, as depicted in key database 520, a first firmware owner ROTPK may be signed by the current system owner's private key, a second firmware owner ROTPK may be signed with the current system owner private key, and a customer custom firmware ROTPK may also be signed with the current system owner's private key. As mentioned, operations pertaining to cryptographic control of computing platform 110, including key and firmware management, for example, may be executed via a software and/or firmware agent at computing platform 110, at times including input obtained from a user, such as a system owner and/or a representative of a system owner.

In an implementation, signed firmware owner's ROTPKs may be stored in a platform's secure storage device, such as non-volatile memory device 530, and/or may be accessible during boot time. Further, in an implementation, a verified boot operation may access a platform ROTPK (e.g., current system owner's ROTPK provisioned as platform ROTPK) to verify firmware ROTPK signatures stored in secure storage. Further, properly signed firmware ROTPKs may be utilized to verify firmware certificates across the multiple signing domains, for example.

In an implementation, a system owner's ROTPK may become a platform ROTPK, as mentioned above and as explained more fully below. As also mentioned, a platform ROTPK may be stored in hardware protected storage, such as hardware protected storage 510, to guard against a security vulnerability. In an implementation, a relatively small amount of space within hardware protected storage 510 may be utilized to store a platform ROTPK and/or a hash of the platform ROTPK. Such a feature may be advantageous for implementations wherein hardware protected storage space may be relatively scarce. For example, One Time Programmable (OTP) device implementations of secure storage have limited storage capacity. Also, in an implementation, firmware owner's ROTPK stored in non-volatile storage may be signed. In an implementation, only a system owner may add and/or remove firmware owner's ROTPKs, and may do so an unlimited number of times, for example. Further, in an implementation, a number of firmware owner keys that may be permitted for a particular computing platform may be limited by a size of a non-volatile storage, such as non-volatile storage 530.

Figure 6:
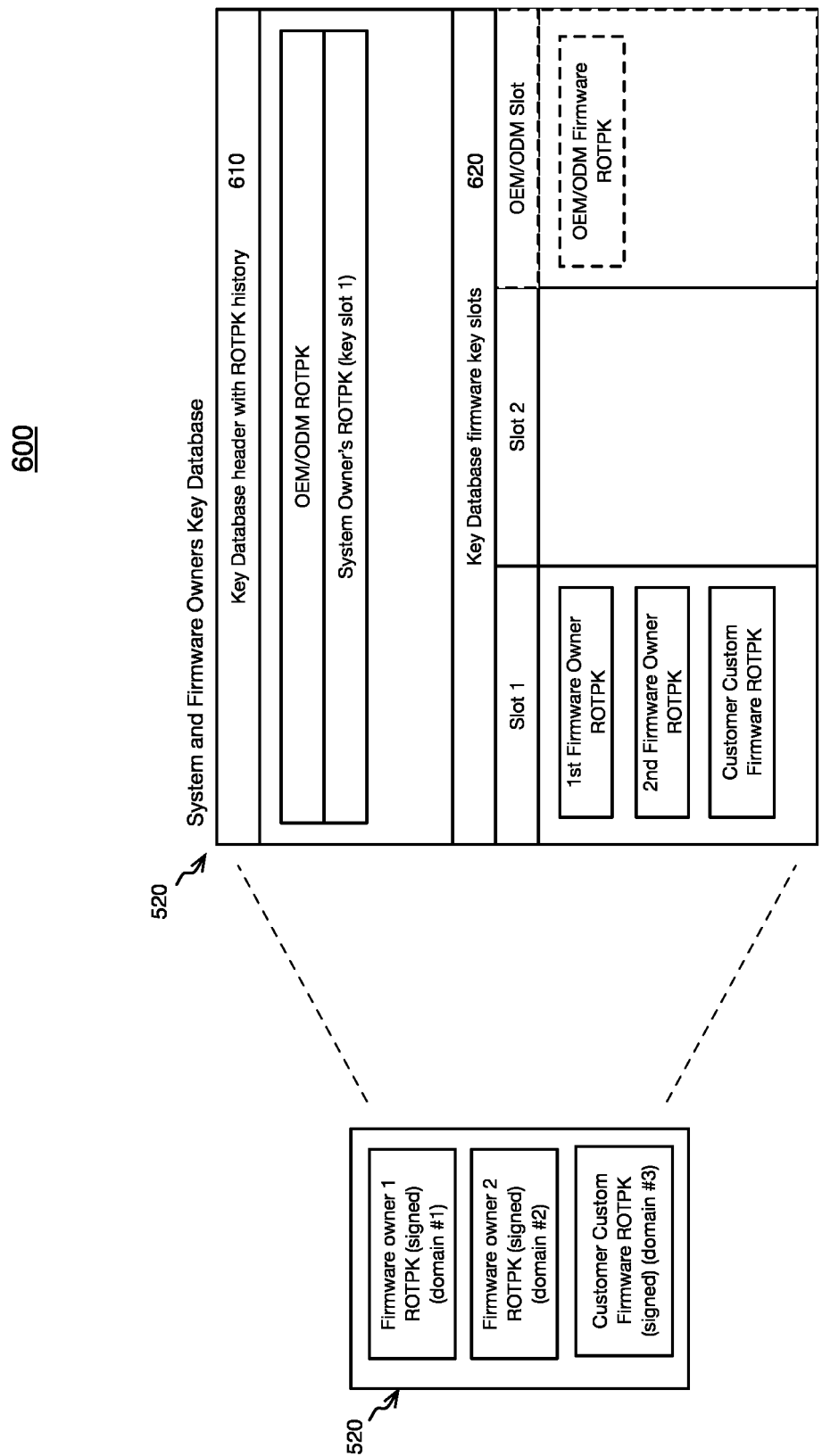
FIGS. 6-8 depict schematic diagrams illustrating an example system and firmware owners key database, in accordance with embodiments.

FIG. 6 is a schematic diagram illustrating an example 600 of key database 520. In an implementation, key database 520 may include a history of system owners' ROTPKs. See, for example, key database header with ROTPK history 610 of example 600. In an implementation, the system owners ROTPK history may include a list of current and/or previous system owner's ROTPKs with a chain of cryptographic signatures that may be utilized for key database integrity validation, for example. Also, for example, key database 520 may include firmware key slots 620. In an implementation, two or more firmware slots may be allocated for implementation of secure transfer between system owners, as explained more fully below. Also, in an implementation, an OEM/ODM firmware slot may be optionally provided. In an implementation, an OEM/ODM firmware slot may be assigned to a current system owner during a system owner transition. Also, for example, OEM/ODM firmware slot may be utilized to store a copy of original OEM/ODM firmware that may be utilized to restore computing platform 110, for example, to an original state. For example, a so-called "golden copy" of firmware may be stored as a means to recover with a secure firmware update in the event other platform firmware fails to boot. Embodiments may be implemented with or without such golden copies of firmware, and claimed subject matter is not limited in scope in these respects.

Additionally, as mentioned, key database 520 may store one or more signed firmware owners' ROTPKs. In an implementation, firmware owner ROTPKs may be signed by a current system owner using the current system owner's private key (e.g., private portion of system owner ROTPK) before being stored in key database 520. In an implementation, signed firmware owner ROTPK may allow a firmware verified boot process to verify validity of stored keys.

Figure 7:
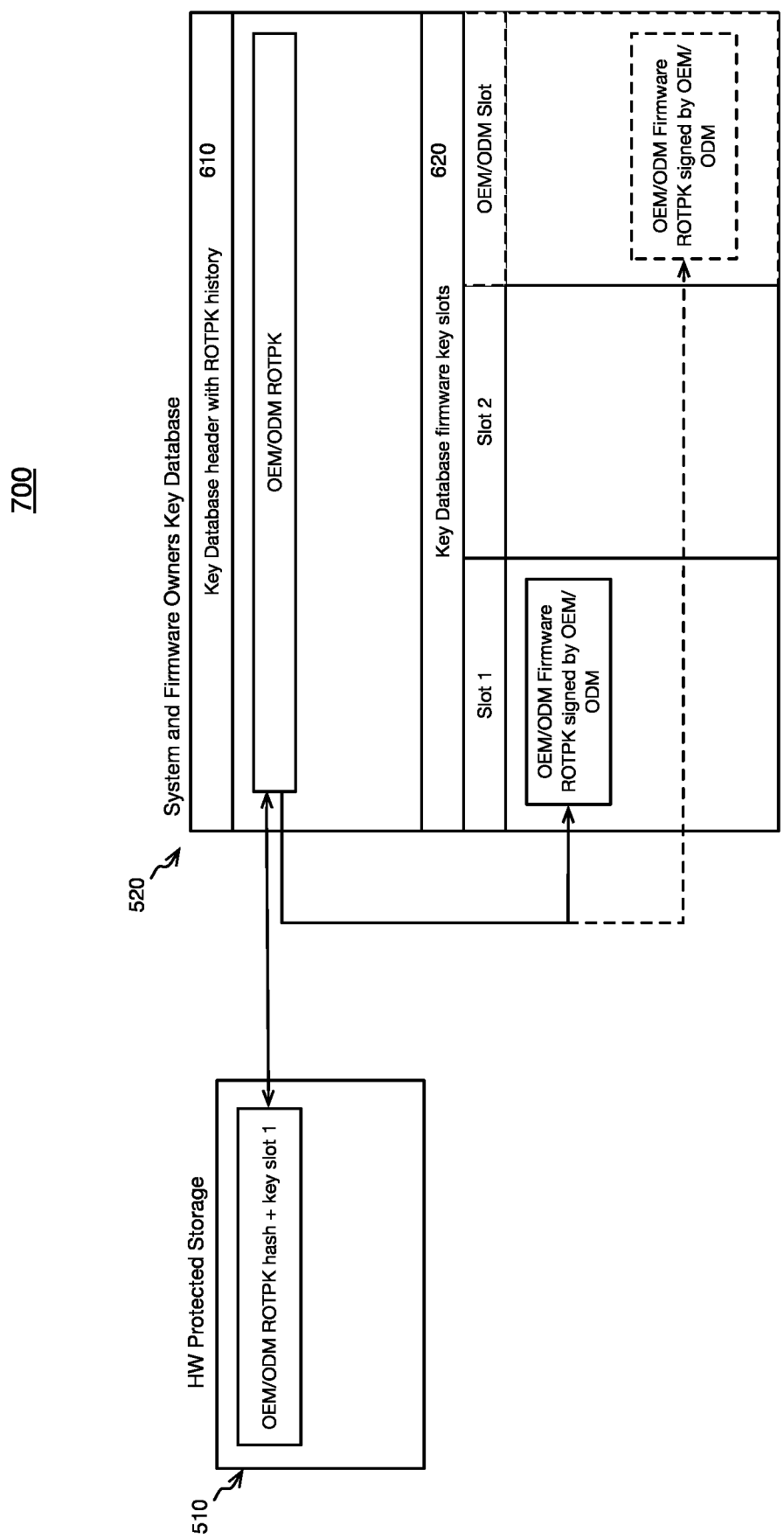

FIG. 7 is a schematic diagram depicting an example 700 showing key database 520 at a first particular point in time, wherein an OEM/ODM is shown as an initial system owner. For example, at a first particular point in time, computing platform 110 may be obtained from an OEM/ODM by a different ownership entity. At the first particular point in time depicted in example 700, key database header with ROTPK history 610 may contain an OEM/ODM ROTPK as a sole ROTPK in the history, indicating the OEM/ODM as an initial and sole system owner. Further, for example 700 at the first particular point in time, key database 520 and hardware protected storage 510 may contain a cryptographic hash of an OEM/ODM ROTPK and a firmware slot value pointing to a firmware key slot containing a OEM/ODM firmware ROTPK, such as slot 1 of key database firmware key slots 620. As mentioned, an OEM/ODM slot within key database firmware key slots 620 may comprise an optional, protected slot that may allow a current system owner to reset computing platform 110 to an original OEM/ODM firmware state.

Figure 8:
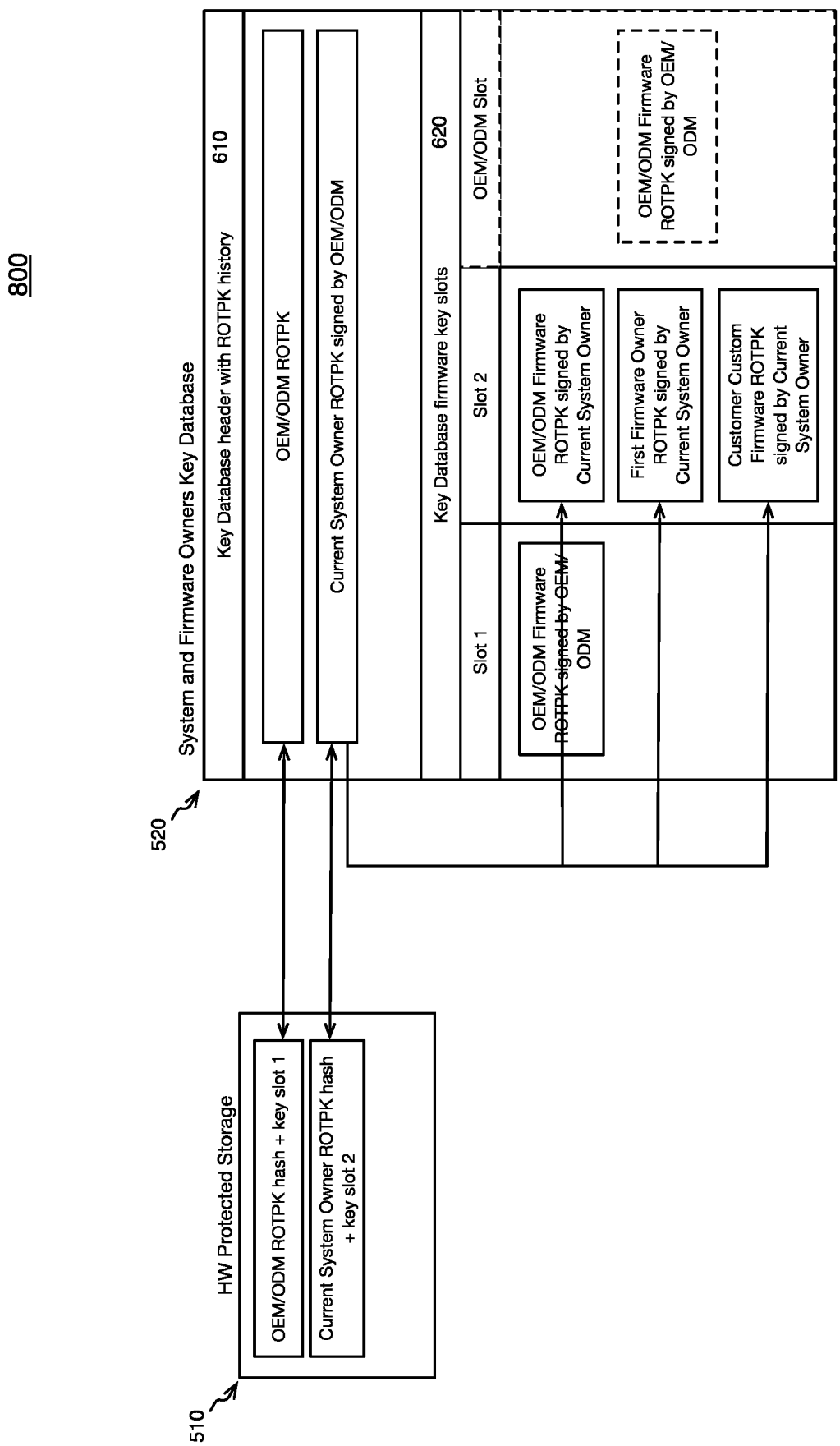

FIG. 8 is a schematic block diagram depicting an example 800 of a transfer of system ownership from a particular system ownership entity, such as an OEM/ODM, to a subsequent system ownership entity. In FIG. 8, the subsequent system ownership entity is labelled as a "current" system owner to indicate that an ownership/control transition from the particular system ownership entity (e.g., OEM/ODM) to the subsequent system ownership entity has occurred. FIGS. 9-12, discussed below, describe in more detail an example process to transfer ownership from a particular system ownership entity, such as an OEM/ODM, to a subsequent system ownership entity. In the discussion surrounding FIGS. 9-12 that follows, FIG. 1 and/or FIG. 8 may be referred to aid in the discussion.

Figure 9:
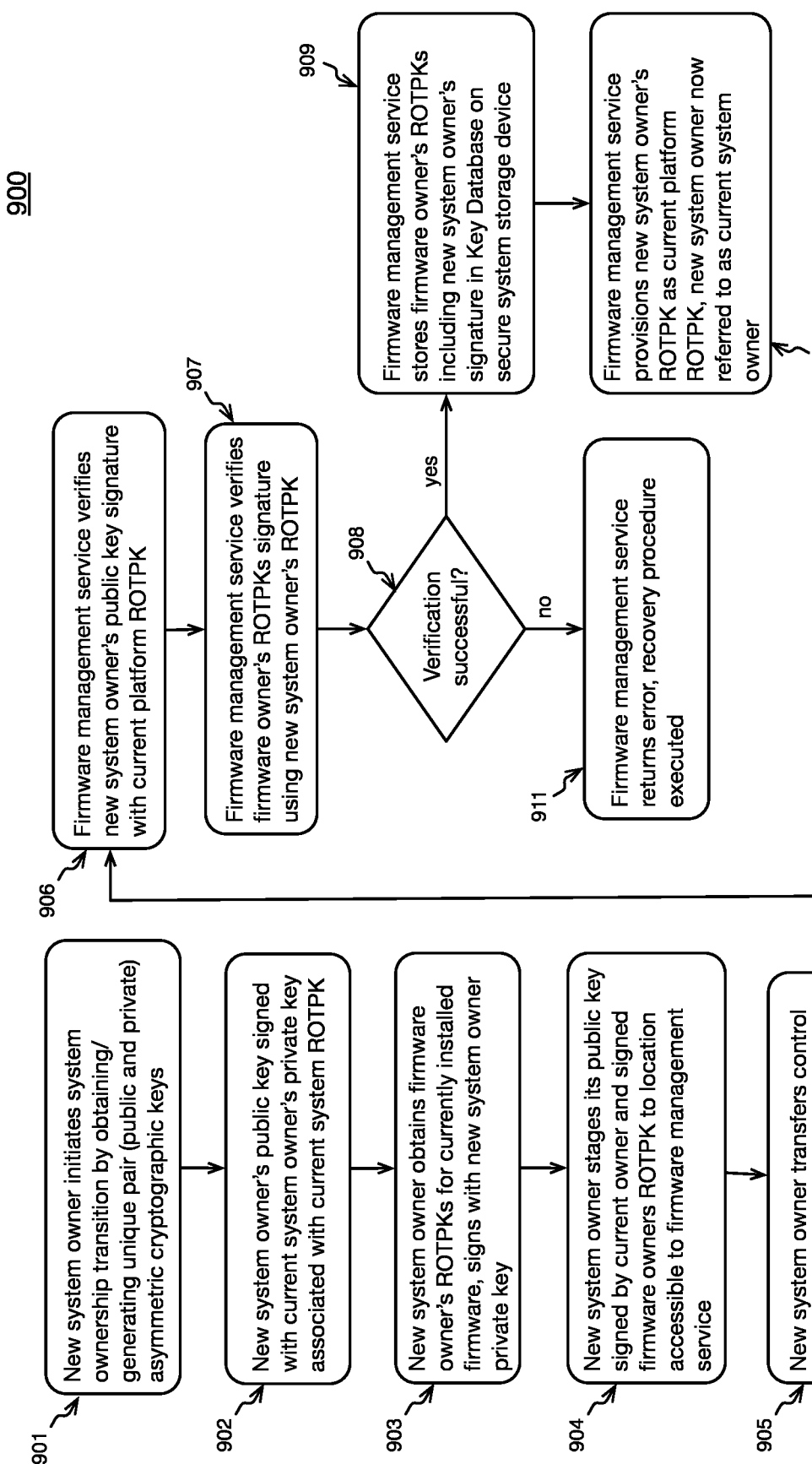
FIG. 9 is a flow diagram depicting an example process for transferring cryptographic control of a computing platform from a particular entity to a new entity, in accordance with embodiments.

FIG. 9 is a flow diagram depicting an embodiment 900 of an example process for transferring cryptographic control of a computing platform, such as computing platform 110, from a particular entity, such as an OEM/ODM, to a subsequent entity (e.g., individual person, organization, representative, etc.). Embodiments in accordance with claimed subject matter may include all of blocks 901-911, fewer than blocks 901-911, and/or more than blocks 901-911. Likewise, it should be noted that content acquired or produced, such as, for example, input signals, output signals, operations, results, etc. associated with example embodiment 900 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, operations performed as depicted in blocks 901-911 may be executed at computing platform 110, such as in connection with a firmware management service, for example. Also, in embodiments, operations executed at computing platform 110 may include obtaining input from a user (e.g., new system owner and/or a representative of a new system owner) via an API, for example. For example, a new system owner may initiate a system ownership transition at least in part via interaction with an API executed at computing device 110.

As indicated at block 901, a new system owner may initiate a system ownership transition (e.g., transfer of cryptographic control) at least in part by obtaining and/or generating a unique pair (e.g., public and private) of asymmetric cryptographic keys. Further, as indicated at block 902, a new system owner's public key, such as a new system owner's ROTPK, may be signed with a current system owner's private key, wherein the current system owner's private key is associated with a current platform ROTPK (e.g., current platform ROTPK is public key counterpart to current system owner's private key). In an implementation, signing a new system owner's ROTPK with a current system owner's private key may include a new system owner initiating communication between new system owner computing platform 110 and current system owner computing device 120. In an implementation, new system owner computing platform 110 may transmit a new system owner's ROTPK to current owner computing device 120 and/or may obtain a signed new system owner ROTPK from current system owner computing device 120.

Further, in an implementation, a new system owner may obtain one or more firmware owners' ROTPKs for currently installed firmware and/or may sign the one or more firmware owners' ROTPKs with a new system owner's private key, as indicated at block 903. Also, as indicated at block 904, a new system owner may stage its signed ROTPK and/or signed firmware owners' ROTPKs to a storage location within computing platform 110 accessible to a firmware management service executed at computing platform 110, for example.

As indicated at block 905, a new system owner may transfer control to a firmware management service, and a firmware management service may verify the new system owner's signed ROTPK against a current platform ROTPK. Additionally, a firmware management service may verify one or more firmware owners' ROTPKs signatures utilizing a new system owner's ROTPK, as indicated at block 907. As further indicated at block 908, at least in part in response to a successful verification a firmware management service may store one or more firmware owners' ROTPKs including a new system owner's signature in a key database, such as key database 520, as indicated at block 909. At block 910, a firmware management service may provision a new system owner's ROTPK as a current platform ROTPK. At this point, the "new" system owner may be referred to as a "current" system owner, such as indicated, for example, in FIG. 8. Returning to block 908, in the event of an unsuccessful verification, a firmware management service may return an error and/or a recovery procedure may be executed, as indicated at block 911.

Figure 10:
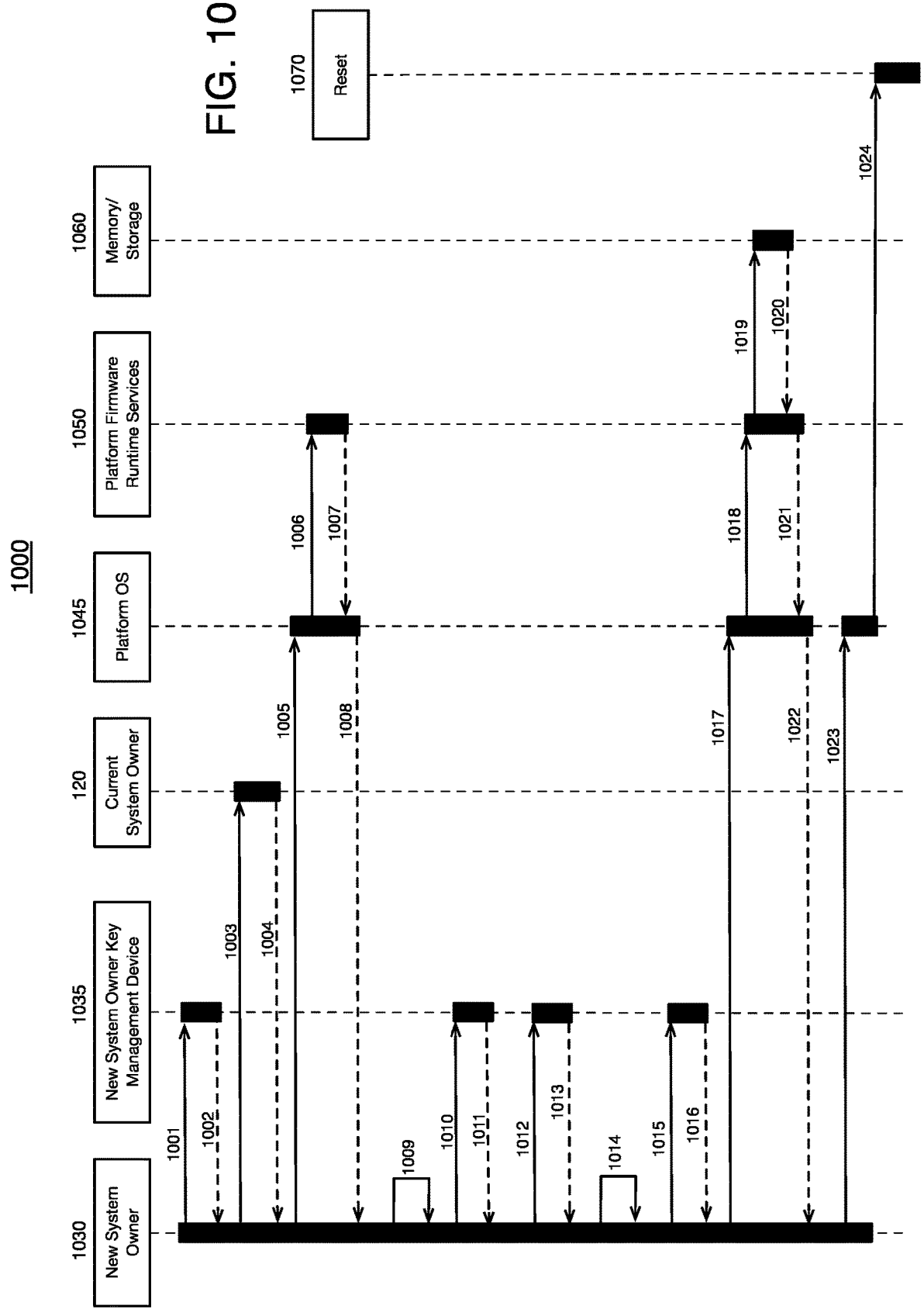
FIGS. 10-12 depict example message flow diagrams for an example process to transfer cryptographic control of a computing platform from a particular entity to a new entity, in accordance with embodiments.

FIG. 10 depicts an example message flow 1000 for an example process to transfer cryptographic control of a computing platform, such as computing platform 110, from a current system owner to a new system owner. Embodiments in accordance with claimed subject matter may include all of messages 1001-1024, fewer than messages 1001-1024, and/or more than messages 1001-1024. Likewise, it should be noted that content acquired or produced, such as, for example, input signals, output signals, operations, results, etc. associated with example message flow 1000 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, messages 1001-1024 may be communicated as one or more signals and/or signal packets among various software, firmware and/or hardware services executed at computing platform 110, for example. Also, in embodiments, one or more of messages 1001-1024 of example message flow 1000 may be communicated at least in part in response to user input obtained via an API executed at computing platform 110, for example. For example, a new system owner may initiate a system ownership transition at least in part via interaction with an API executed at computing device 110. For example message flow 1000, a new system owner service 1030 may comprise a software and/or firmware agent executed at computing platform 110. In an implementation, a user (e.g., new system owner and/or representative of a new system owner) may interact with service 1030 via a graphical user interface, input device, etc. for initiation of one or more of messages 1001-1024, in an implementation. Also, in an implementation, example message flow 1000 may be executed in either a trusted or non-trusted execution environment.

In an implementation, message 1001 may represent a request from a new system owner 1030 to a new system owner key management device 1035 to generate and/or otherwise obtain a pair of asymmetric cryptographic keys and/or certificates, such as a new system owner ROTPK and an associated private key. In an implementation, a new system owner may utilize an already-existing pair of asymmetric private and public keys. In an implementation, device 1035 may comprise a service executed at computing device 110. In another implementation, device 1035 may comprise an external computing device that may communicate with computing device 110 via a network, for example. In an implementation, new system owner 1030 may obtain a new system owner ROTPK and an associated private key from new system owner keys management device 1035, as represented by message 1002.

As represented by messages 1003 and/or 1004, new system owner 1030 may transmit a new system owner ROTPK to a current system owner computing device 120 and/or may obtain the new system owner ROTPK signed with a current system owner's private key, for example. In an implementation, a current system owner may comprise an OEM/ODM, although current system owners may include other entity types in other implementations. In an implementation, new system owner 1030 may transmit a request for current firmware ROTPKs to a platform operating system (OS) 1045 via message 1005. In turn, platform OS 1045 may provide a request via message 1006 for firmware ROPTKs to a platform firmware runtime service 1050. Service 1050 may return one or more firmware ROTPKs to platform OS via message 1007, and platform OS 1045 may provide one or more firmware ROTPKs to new system owner 1030 via message 1008, for example.

In an implementation, a message count may be initialized at least in part via a random number generator, as represented by message 1009. In an implementation, a true random number generator (TRNG) may be utilized for initializing a message count. Also, in an implementation, a message count may be signed at the new system owner's key management device 1035 using the new system owner's private key associated with the new system owner's ROTPK, as represented by messages 1010 and 1011. Additionally, firmware keys may be signed with the new system owner's private key at the new system owner's key management device 1035, as represented, for example, by messages 1012 and 1013. Further, in an implementation, a trusted authority change message may be generated, wherein the trusted authority change message may have a payload including the new system owner ROTPK, signed firmware ROTPKs and/or signed message count, for example, as indicated by message 1014. As further represented by messages 1015 and 1016, a generated trusted authority change message may be signed with the new system owner's private key at the new system owner's keys management device 1035, in an implementation. In an implementation, new system owner 1030 may generate a hash of the generated trusted authority change message and/or may sign a resulting hash value with the new system owner's private key.

As further represented by message 1017, a request to stage a generated trusted authority change message may be provided from the new system owner 1030 to platform OS 1045. Further, as represented by message 1018, the platform OS 1045 may stage a generated trusted authority change message to the platform firmware runtime services 1050. Additionally, as represented by message 1019, a generated trusted authority change message may be stored at memory/storage 1060. In an implementation, memory/storage 1060 may comprise a non-volatile storage of computing platform 110. In an implementation, memory/storage 1060 may provide an indication that a staged message has been stored, as indicated by message 1020. Also, for example, platform firmware runtime services 1050 may provide an acknowledgement via message 1021 to the platform OS 1045 that a message has been staged. Further, as represented by message 1022, for example, platform OS 1045 may indicate to the new system owner 1030 that a generated trusted authority change message has been staged.

In an implementation, new system owner 1030 may request to the platform OS 1045 to reboot computing platform 110, as represented by message 1023. Further, as indicated by message 1024, reset circuitry 1070 may execute a system reboot as a response at least in part to message 1024, in an implementation.

Figure 11:
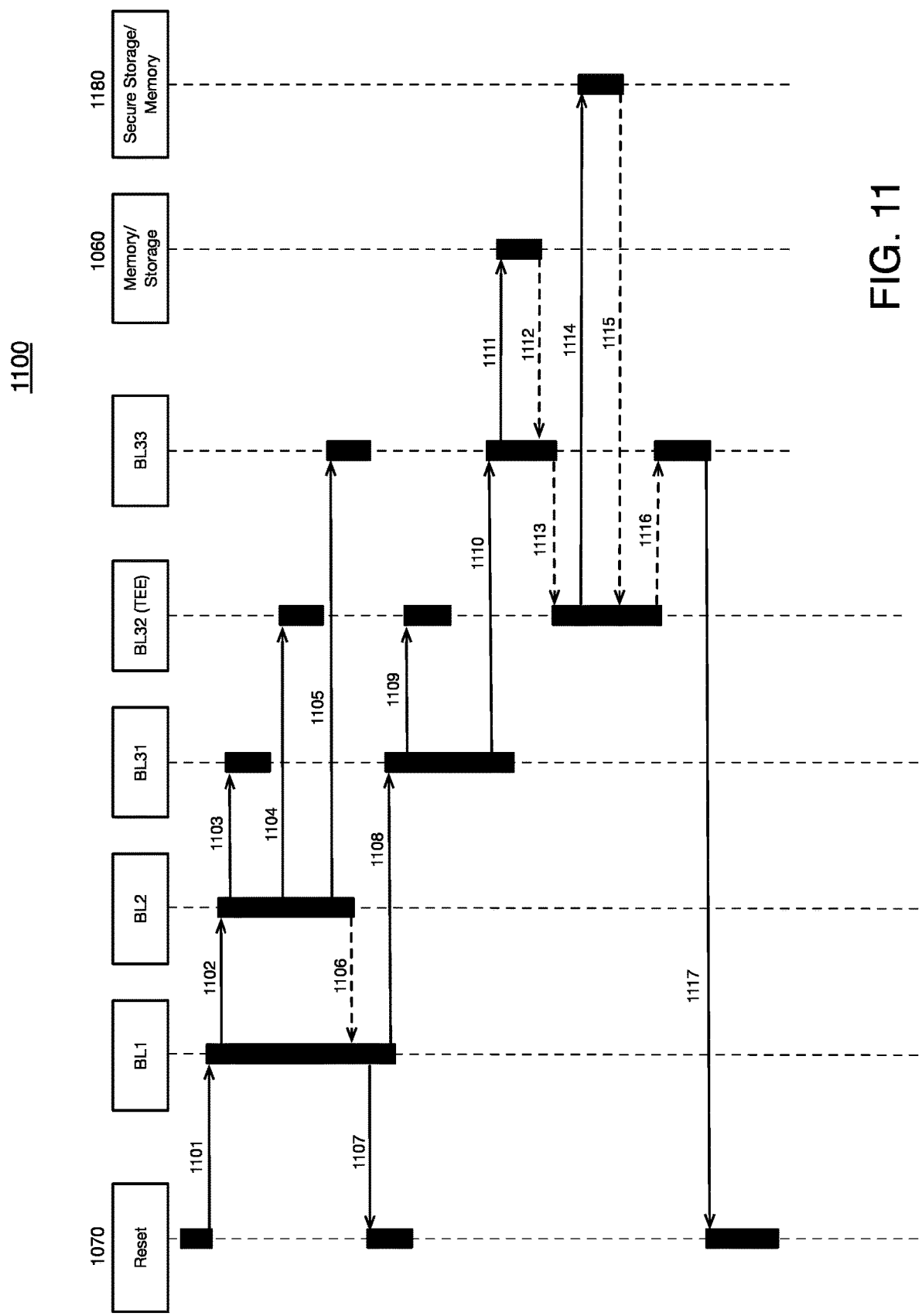

FIG. 11 depicts an example message flow 1100 for an example process to transfer cryptographic control of a computing platform, such as computing platform 110, from a current system owner to a new system owner. Embodiments in accordance with claimed subject matter may include all of messages 1101-1117, fewer than messages 1101-1117, and/or more than messages 1101-1117. Likewise, it should be noted that content acquired or produced, such as, for example, input signals, output signals, operations, results, etc. associated with example message flow 1100 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, messages 1101-1117 may be communicated as one or more signals and/or signal packets among various software, firmware and/or hardware services executed at computing platform 110, for example. In an implementation, example message flow 1100 may be executed at least in part in a trusted execution environment (TEE).

As indicated above, such as discussed in connection with message 1023, new system owner 1030 may initiate a computing platform 110 reboot to allow a staged message to be processed by a trust authority service. In some implementations, a staging process may incorporate multiple system reboots, depending on a particular implementation. Example message flow 1100 depicts an extension of the staging process of example message flow 1000, wherein message flow 1100 may be implemented at least in part within a trusted execution environment and utilizing, at least in part, secure non-volatile storage at computing platform 110 as an intermediate mechanism for transferring a staged message from a non-trusted execution environment to a trusted execution environment. In an implementation without a trusted execution environment, a message may be staged using a non-volatile memory device and/or other memory device that is not affected by a system reset.

In an implementation, message 1101 from reset circuitry 1070 may indicate to firmware boot loader stage BL1 that a system reset has occurred. At least in part in response to a message 1101 indicative of a system reset having occurred, boot loader stage BL1 may indicate via message 1102 to load and verify boot loader stage BL2. Further, in an implementation, boot loader stage BL2 may indicate via message 1103 to load and verify boot loader stage BL31. Boot loader stage BL2 may further indicate, such as via messages 1104 and 1105, to load and verify boot loader stages BL32 and BL33, respectively. As represented by message 1106, boot loader stage BL2 may return a firmware load status value to boot loader stage BL1. In an implementation, a failure to load and/or verify any of boot loader stages BL1, BL2, BL 31, BL 32 and/or BL 33 may result in a failure/reset message 1107 communicated to reset circuitry 1070.

As represented by messages 1108, 1109 and/or 1110, control of execution of code for computing platform 110 may be transferred to a trusted execution environment, including, for example, executing code from boot loader stage BL32. Further, firmware code, such as code from boot loader stage BL33, may be executed outside of a trusted execution environment. For example, as indicated by message 1111, execution of code from boot loader stage BL33 may result in a staged message, such as a trusted authority change message staged in accordance with example message flow 1000, being read from memory/storage 1060, as further indicated by message 1112. Additionally, in an implementation, execution of code from boot loader stage BL33 may provide (e.g., via a push-type message) the previously staged message to trusted execution environment BL32 as indicated by message 1113. Further, as represented by messages 1114 and 1115, the previously staged message may be stored in secure storage/memory 1180. In an implementation, message 1116 may be pushed from trusted execution environment BL32 to non-trusted execution environment BL33, and another system reset message 1117 may be provided to reset circuitry 1070.

Figure 12:
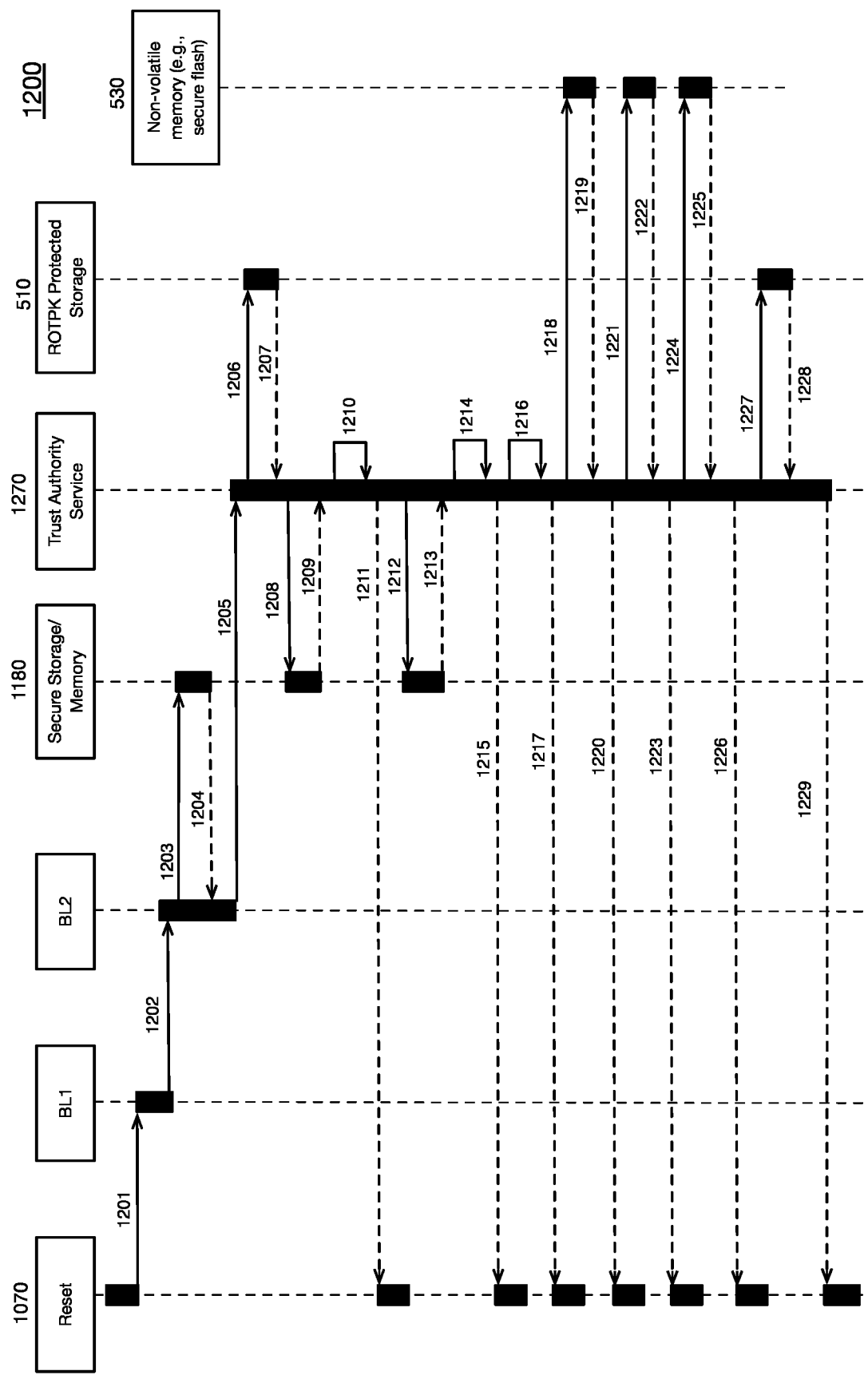

FIG. 12 depicts an example message flow 1200 which may comprise a continuation of example process 1100 described above in connection with FIG. 11. Embodiments in accordance with claimed subject matter may include all of messages 1201-1229, fewer than messages 1201-1229, and/or more than messages 1201-1229. Likewise, it should be noted that content acquired or produced, such as, for example, input signals, output signals, operations, results, etc. associated with example message flow 1200 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, messages 1201-1229 may be communicated as one or more signals and/or signal packets among various software, firmware and/or hardware services executed at computing platform 110, for example. In an implementation, example message flow 1200 may be executed at least in part in a trusted execution environment (TEE).

In an implementation, as indicated by arrow 1201, a processor may begin execution from firmware boot loader stage BL1 at least in part in response to a system reset. In an implementation, boot loader stage BL1 may indicate via message 1202 to boot loader stage BL2 to check secure storage/memory 1180 for a trusted authority change message, such as a trusted authority change message previously stage as indicated by messages 1114 and 1115, discussed above. As indicated by messages 1203 and 1204, boot loader stage BL2 may read a trusted authority change message from secure storage/memory 1180 at least in part responsive to a determination that the trusted authority change message has been staged at secure storage/memory 1180.

As indicated by message 1205, the previously staged trusted authority change message, including new system owner ROTPK, signed firmware owner ROTPKs and/or a signed message count value, may be provided to a trust authority service 1270, in an implementation. At least in part in accordance with the trusted authority change message, a current platform ROTPK may be retrieved from ROTPK protected storage 510, as indicated by messages 1206 and 1207. Further, trusted authority service 1270 may retrieve a new system owner's ROTPK from secure storage/memory 1180, as indicated by messages 1208 and 1209.

As further indicated by message 1210, trusted authority service 1270 executed at computing device 110 may verify a new system owner's ROTPK signature (e.g., signed using a current system owner's private key) utilizing a current platform ROTPK (e.g., current system owner's ROTPK). As indicated by message 1211, a verification error may result in a system reset message being provided to system reset circuitry 1070. Also, as indicated by messages 1215, 1217, 1220, 1223, 1226 and/or 1229, errors at one or more aspects of example message flow 1200 may result in a system reset. In an implementation, the staged message may be de-staged in response to beginning to process the message so that a subsequent reset would not result in the message being found and reprocessed again.

Returning to message 1210 indicating a verification of a new system owner's ROTPK signature using a current platform ROTPK, a successful verification may result in messages 1212 and/or 1213 whereby trusted authority service 1270 may obtain one or more signed firmware owners' ROTPKs and a signed message count value previously stored in secure storage/memory 1180 as part of the staged trusted authority change message. In an implementation, one or more firmware owners' ROTPK signatures and a signed message count value may be verified at least in part using a new system owner's ROTPK, as indicated by message 1214. Additionally, as represented by message 1216, current firmware images may be verified using, at least in part, one or more firmware owners' ROTPKs.

As further indicated by message 1218, trusted authority service 1270 may initialize a particular firmware bank, such as Key Database firmware key slot 620, at a non-volatile memory (e.g., secure flash) 530 and/or may store a new system owner's ROTPK at non-volatile memory 530. For example, a particular firmware slot may be initialized and/or a new system owner's ROTPK may be stored at key database 520. Also, for example, message 1219 may represent a firmware bank, such as Key Database firmware key slot 620, initialization status message.

Additionally, signed firmware keys, such as signed firmware ROTPKs, may be stored in non-volatile memory 530, for example, as indicated by message 1221 between trust authority service 1270 and non-volatile memory 530. Message 1222 may represent a firmware key write status message, for example. In an implementation, signed firmware ROTPKs may be stored in a specified slot of key database 520, as mentioned above. Further, in an implementation, a signed message count value may also be stored in non-volatile memory 530, as indicated by message 1224. In an implementation, message 1225 may represent a message count write status message.

In an implementation, a new system owner's ROTPK and/or a particular firmware bank number (e.g., key database firmware key slot value) may be written to ROTPK protected storage 510 by trust authority service 1270, as indicated by message 1227. Further, message 1228 may represent a new system owner's ROTPK write status message, for example. In an implementation, writing a new system owner's ROPTK to ROPTK hardware protected storage 510 may at least partially complete a transition of cryptographic control from a current system owner to the new system owner. As indicated by message 1229, a system reset may be indicated at least in part responsive to a new system owner's ROTPK being written to ROPTK hardware protected storage.

Returning to FIG. 8, it may be observed that when compared to FIG. 7, hardware protected storage may, at the subsequent point in time and at least in part responsive to the operations of example message flows 1000, 1100 and/or 1200, have stored therein a new system owner's ROTPK indicative of a current system owner (e.g., OEM/ODM ROPTK represents a previous owner ROPTK) and a value identifying a particular slot from key database firmware key slots 620. Further, key database header 610 of key database 520 may include a new system owner ROTPK sighed by a previous owner (e.g., OEM/ODM). In an implementation, a signed new system owner ROPTK may sit atop a chain of trust that may include firmware from one or more firmware owners. For example, slot 2 of key database firmware slots 620 may contain some firmware from OEM/ODM, some firmware from a first firmware owner and/or some firmware that may be custom developed in-house. As depicted in FIG. 8, each of the firmware owner's ROPTKs stored at slot 2, notably including firmware from any previous system owner, such as an OEM/ODM as merely one example, may be signed by a new system owner.

Figure 13:
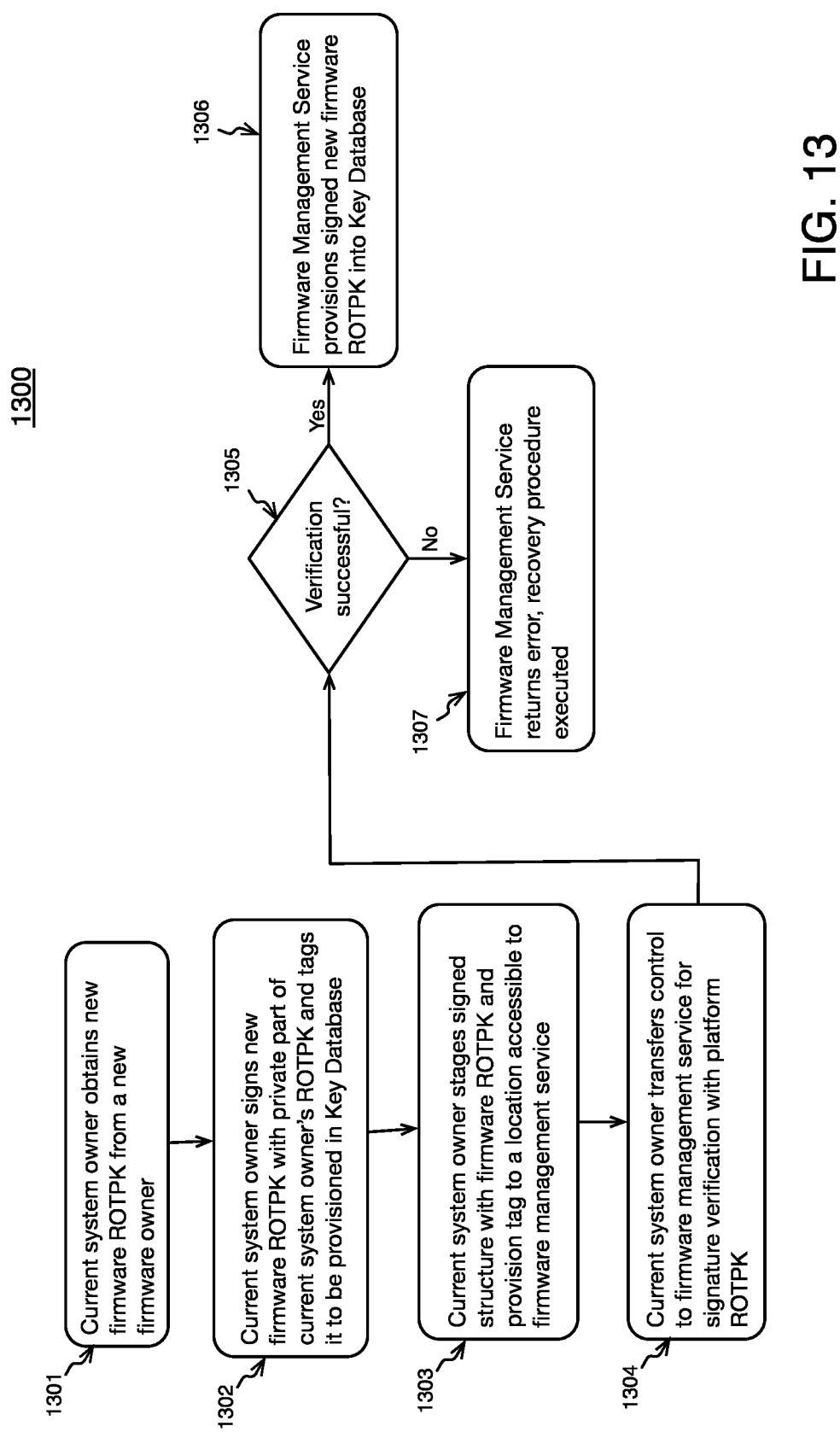
FIG. 13 is a flow diagram depicting an example process for provisioning a new firmware owner's root of trust key for a computing device, in accordance with embodiments.

FIG. 13 is a flow diagram depicting an embodiment 1300 of an example process for provisioning a one or more new firmware owners' ROTPKs for a computing device, such as computing platform 110. Embodiments in accordance with claimed subject matter may include all of blocks 1301-1307, fewer than blocks 1301-1307, and/or more than blocks 1301-1307. Likewise, it should be noted that content acquired or produced, such as, for example, input signals, output signals, operations, results, etc. associated with example embodiment 1300 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, operations performed as depicted in blocks 1301-1307 may be executed at computing platform 110, for example. Also, in embodiments, operations executed at computing platform 110 may include obtaining input from a user (e.g., system owner and/or a representative of a system owner) via an API, for example.

At bock 1301, for example, a current system owner may obtain one or more new firmware ROTPKs from one or more new firmware owners. For example, a current system owner may desire to take advantage of new functionality that may be provided by third-party firmware. A current system owner may obtain firmware code from a firmware owner computing device, such as firmware owner computing device 130, for example, and/or may also obtain a firmware ROTPK from firmware owner computing device 130. In an implementation, a current system owner may obtain a new firmware ROTPK at least in part via user interaction with an API executed at computing platform 110, for example.

Additionally, as indicated at block 1302, a current system owner may cryptographically sign a new firmware ROTPK with a private key associated with a current system owner's ROTPK (e.g., current platform ROTPK). Further, as also indicated at block 1302, a current system owner may tag a new firmware ROTPK to be provisioned in a key database, such as key database 520. In an implementation, a current system owner may sign a content structure containing, for example, a new firmware ROTPK and a provision tag and/or may stage the signed content structure to a storage location accessible to a firmware management service, as indicated at block 1303.

In an implementation, a current system owner may transfer control of execution of code for computing platform 110 to a firmware management service for signature verification using a platform ROTPK. See, for example, block 1304. Additionally, as indicated at blocks 1305 and 1306, at least in part responsive to a successful signature verification, a firmware management service may provision a signed new firmware ROTPK into a key database, such as key database 520. In an implementation, an unsuccessful verification at block 1305 may result in a firmware management service returning an error and/or executing a recovery procedure, as indicated at block 1307.

Figure 14:
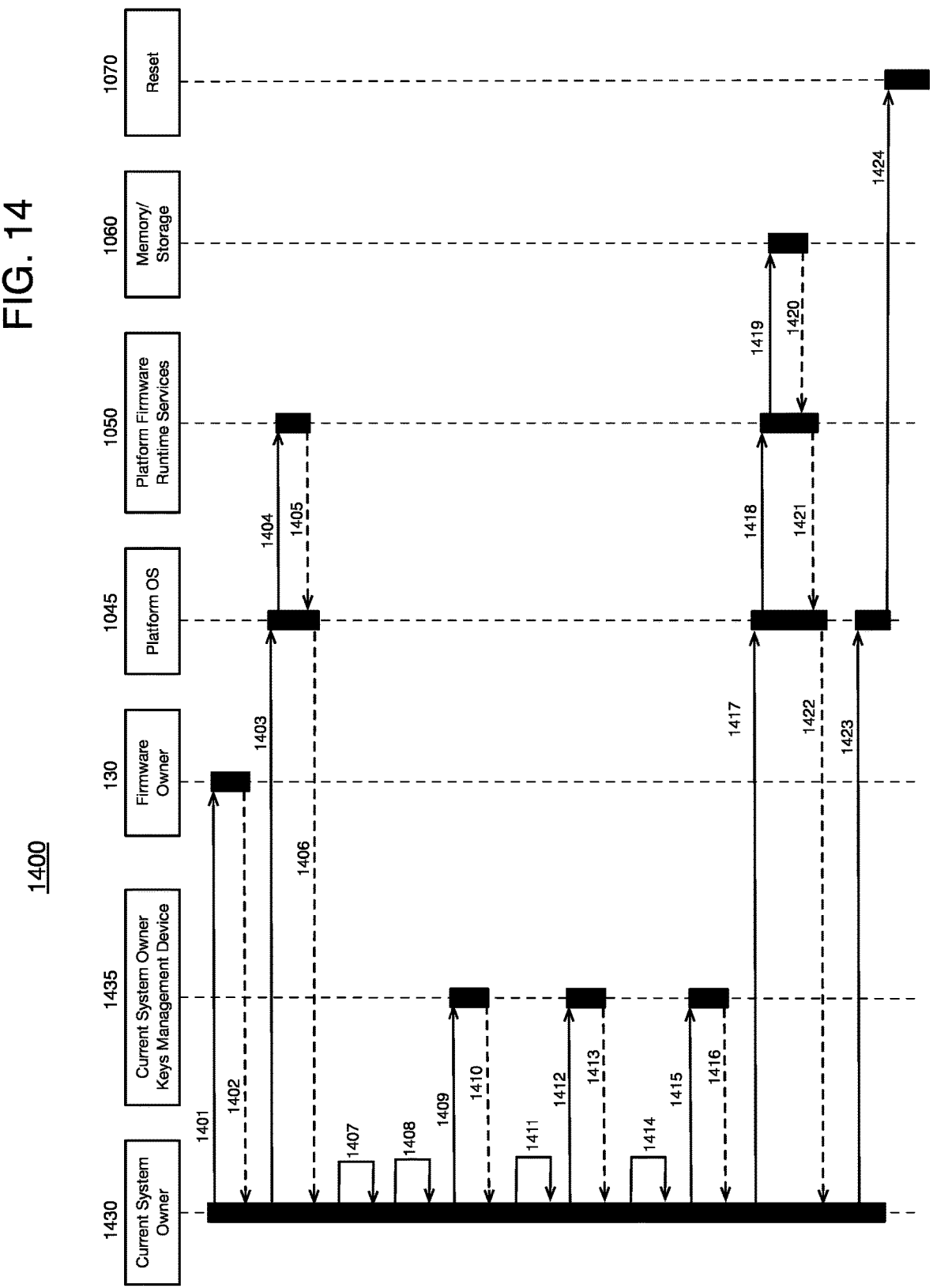
FIGS. 14-15 depict example message flow diagrams for an example process to provision a new firmware owner's root of trust key for a computing device, in accordance with embodiments.

FIG. 14 depicts an example message flow 1400 for provisioning, at least in part, a new firmware ROTPK at a computing platform, such as computing platform 110. Embodiments in accordance with claimed subject matter may include all of messages 1401-1424, fewer than messages 1401-1424, and/or more than messages 1401-1424. Likewise, it should be noted that content acquired or produced, such as, for example, input signals, output signals, operations, results, etc. associated with example message flow 1400 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, messages 1401-1424 may be communicated as one or more signals and/or signal packets among various software, firmware and/or hardware services executed at computing platform 110, for example. Also, one or more of messages 1401-1424 of example message flow 1400 may be communicated at least in part in response to user input obtained via an API executed at computing platform 110, for example. For example, a current system owner may initiate provision of a new firmware ROTPK at least in part via interaction with an API executed at computing device 110. For example message flow 1400, a current system owner service 1430 may comprise a software and/or firmware agent executed at computing platform 110 whereby a user (e.g., current system owner and/or representative of a current system owner) may interact with service 1430 via a graphical user interface, input device, etc. for initiation of one or more of messages 1401-1424, in an implementation. Also, in an implementation, example message flow 1400 may be executed in a normal (e.g., non-trusted) execution environment.

Example message flow 1400 may include staging a message to provision a new firmware ROTPK in memory/storage 1060 in order to allow the staged message to be processed by a trust authority service. In an implementation, as represented by messages 1401 and/or 1402, current system owner 1430 may obtain a new firmware ROTPK from firmware owner computing device 130, in an implementation. Further, as indicated by message 1403, current system owner 1430 may initiate a read request for a current message count directed to platform OS 1045. In turn, for example, platform OS 1045 may obtain a current message count from platform firmware runtime services 1050, as indicated by messages 1404 and/or 1405, for example. Further, as indicated by message 1406, a message count may be provided by platform OS 1045 to current system owner 1430, in an implementation.

Additionally, as indicated by message 1407, a new firmware key provision message may be created at least in part by current system owner 1430. Also, as indicated by message 1408, a message count may be incremented by one, in a particular implementation. Further, as indicated by message 1409, a current system owner key management device 1435 may sign the incremented message count utilizing a system owner's private key. As further indicated by message 1410, a signed message count may be provided by current system owner key management device 1435 to current system owner 1430, in an implementation.

In an implementation, an indication of association with one or more boot loader stages may be included in a firmware key structure, as indicated by message 1411. Further, as indicated by message 1412, a current system owner keys management device 1435, for example, may sign a new firmware ROTPK for associated boot loader stages utilizing a system owner's private key. In an implementation, this boot loader association may create a way to set a firmware ROTPK's scope for one or multiple boot loader stages. For example, the scope may prevent installation of firmware for a specific boot loader stage even if the firmware owner ROTPK was provisioned into the key database. Also, a signed firmware ROPTK may be returned to current system owner 1430 as indicated by message 1413. As additionally indicated by message 1414, a signed firmware ROPTK and a signed message count value may be added to a message to provision a new firmware ROPTK. In an implementation, a message to provision a new firmware ROTPK may be signed by current system owner keys management device 1435 utilizing a system owner's private key and the signed message may be provided to current system owner 1430, as indicated by messages 1415 and/or 1416.

Further, in an implementation, a request to stage a message to provision a new firmware ROPTK may be provided from current system owner 1430 to platform OS 1045 by way of message 1417, for example. A message 1418 may further indicate that a request to stage a message to provision a new firmware ROPTK may be provided from platform OS to platform firmware runtime services 1050 at least in part via message 1418. As further indicated by message 1419, a message to provision a new firmware ROPTK may be stored at memory/storage 1060. Additionally, message 1420 may indicate to platform firmware runtime services 1050 that the message has been successfully saved at memory/storage 1060. Further, message 1421 may indicate to platform OS 1045 that the message has been successfully staged and message 1422 may indicate to current system owner 1430 that the message to provision a new firmware ROTPK has been successfully staged. In an implementation, responsive at least in part to the message to provision the new firmware ROTPK being successfully staged in memory/storage 1060, current system owner 1430 may provide via message 1423 a request to platform OS 1045 to reset computing platform 110. Platform OS 1045 may signal a system reset to system reset circuitry 1070, as represented by message 1424.

Figure 15:
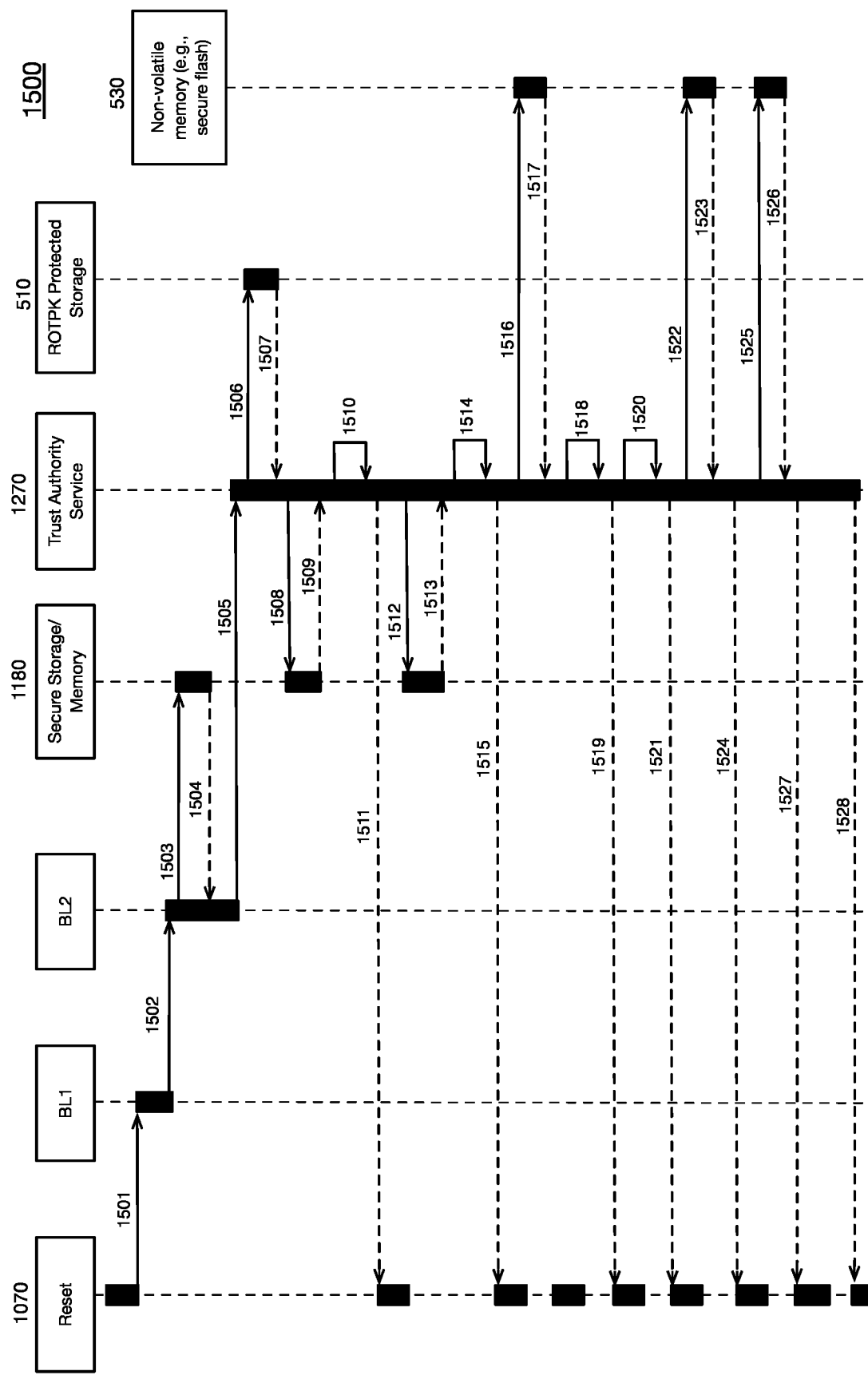

FIG. 15 depicts an example message flow 1500 for provisioning, at least in part, a new firmware ROPTK at a computing platform, such as computing platform 110. In an implementation, example message flow 1500 may comprise an extension in at least some respects of example message flow 1400 in provisioning a new firmware ROTPK for computing platform 110. Embodiments in accordance with claimed subject matter may include all of messages 1501-1528, fewer than messages 1501-1528, and/or more than messages 1501-1528. Likewise, it should be noted that content acquired or produced, such as, for example, input signals, output signals, operations, results, etc. associated with example message flow 1500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, messages 1501-1528 may be communicated as one or more signals and/or signal packets among various software, firmware and/or hardware services executed at computing platform 110, for example. In an implementation, example message flow 1500 may be executed at least in part in a trusted execution environment (TEE).

In an implementation, as indicated by arrow 1501, a processor may begin executing from firmware boot loader stage BL1 at least in part in response to a system reset. In an implementation, boot loader stage BL1 may transfer control, as indicated by arrow 1502, to boot loader stage BL2. In an implementation, boot loader stage BL2 may check secure storage/memory 1180 for a new firmware ROPTK provision request message, such as a new firmware ROPTK provision request message previously staged as indicated by messages 1417 and 1422, discussed above. As indicated by messages 1503 and 1504, boot loader stage BL2 may read a new firmware ROPTK provision request message from secure storage/memory 1180 at least in part responsive to a determination that the new firmware ROPTK provision request message has been staged at secure storage/memory 1180.

As further indicated by message 1505, the previously staged new firmware ROPTK provision request message, including a signed firmware ROPTK and a message count value, may be provided to trust authority service 1270, in an implementation. At least in part in accordance with the new firmware ROPTK provision request message, a current platform ROTPK and/or a key database bank value (e.g., slot number) may be retrieved from ROTPK protected storage 510, as indicated by messages 1506 and/or 1507. Further, trusted authority service 1270 may retrieve a new firmware owner's ROTPK from secure storage/memory 1180, as indicated by messages 1508 and/or 1509. Additionally, as represented by message 1510, trusted authority service 1270 may verify a new firmware owner's ROTPK signature utilizing a current platform ROTPK. As indicated by message 1511, a verification error may result in a system reset message being provided to system reset circuitry 1070. Also, as indicated by messages 1515, 1519, 1521, 1524 and/or 1527, errors at one or more aspects of example message flow 1500 may result in a system reset. As mentioned, in an implementation, the staged message may be de-staged in response to beginning to process the message so that a subsequent reset would not result in the message being found and reprocessed again. For example, for a system reset due to an error, a transition process may be terminated and/or cancelled and/or all staged messages may be deleted and/or ignored.

Returning to message 1510 indicating a verification of a new firmware owner's ROTPK signature using a current platform ROTPK, a successful verification may result in messages 1512 and/or 1513 whereby trusted authority service 1270 may obtain a new message count value and/or a new message count value signature from a new firmware provision request message stored at secure storage/memory 1180. In an implementation, the new message count value may be verified at least in part using a current platform ROTPK, as indicated by message 1514. Additionally, as represented by message 1516, a current message count may be retrieved from non-volatile memory 530 and, as indicated by message 1517, may be provided to trust authority service 1270. Further, as represented by message 1518, the current message count signature may be verified utilizing a current platform ROTPK. Additionally, as illustrated by message 1520, a determination may be made as to whether the new message count was incremented by a value of one, for example.

In an implementation, a signed new firmware ROTPK may be stored at non-volatile memory 530, as indicated, for example, by message 1522. Additionally, for example, allowed and/or signed firmware boot loader stages may be stored in non-volatile memory 530, in an implementation. In an implementation, message 1523 may be provided from non-volatile memory 530 to trust authority service 1270 to confirm that a new firmware ROPTK has been added to non-volatile memory 530 in accordance with a new firmware ROPTK provision request message generated at example message flow 1400, discussed above. Additionally, as indicated by messages 1525 and 1526, a cryptographically signed new message count may be written to non-volatile memory 530, in an implementation. Further, in an implementation, trusted authority service 1270 may provide a system reset request to system reset circuitry 1070 at least in part responsive to completion of a process to provision a new firmware ROPTK in a non-volatile memory, such as key database 520 of non-volatile memory 530, of computing platform 110.

Figure 16:
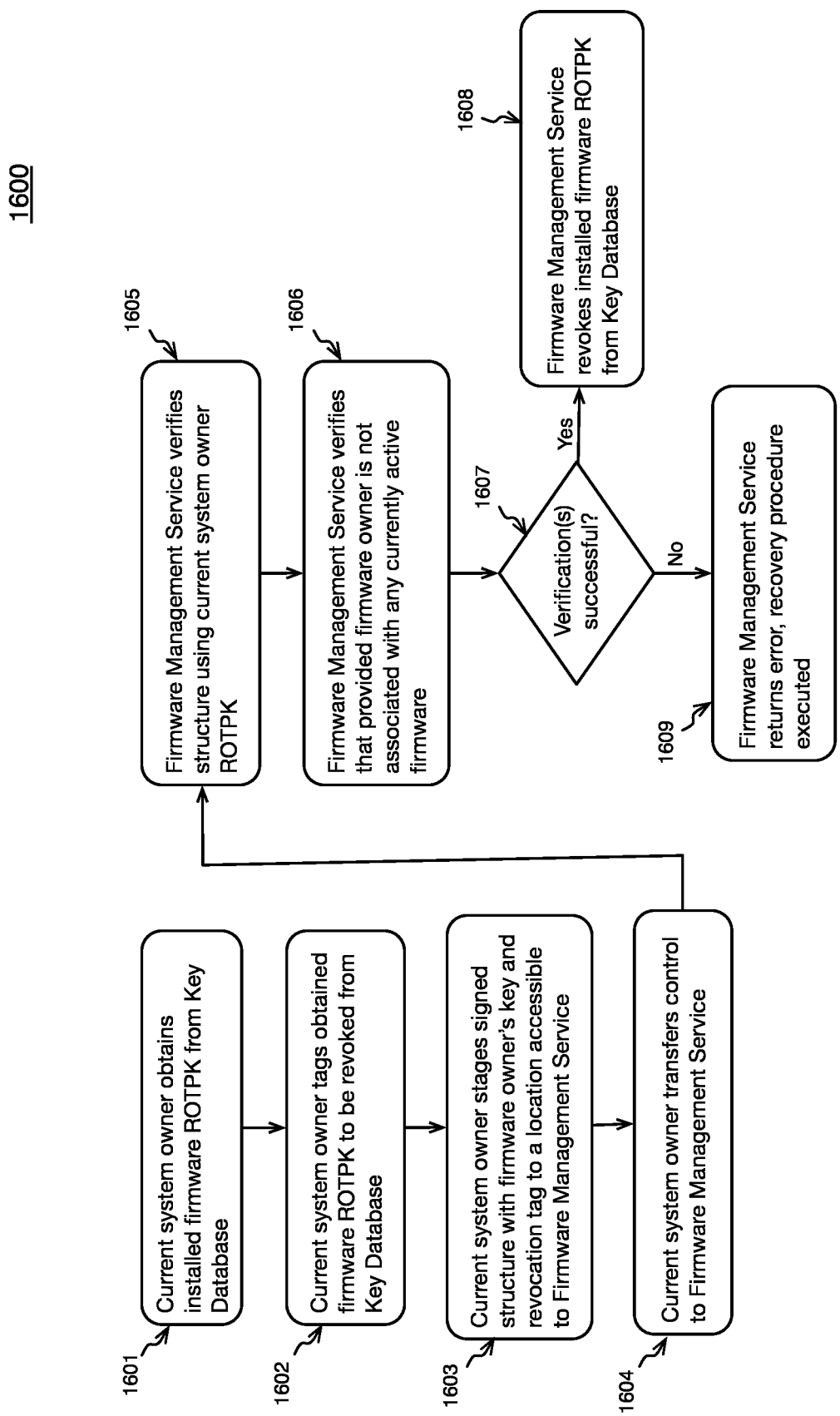
FIG. 16 is a flow diagram illustrating an example process for revoking an installed firmware owner's root of trust key for a computing device, in accordance with embodiments.

FIG. 16 is a flow diagram illustrating an embodiment 1600 of an example process for revoking an installed firmware ROTPK for a computing device, such as computing platform 110. Embodiments in accordance with claimed subject matter may include all of blocks 1601-1609, fewer than blocks 1601-1609, and/or more than blocks 1601-1609. Likewise, it should be noted that content acquired or produced, such as, for example, input signals, output signals, operations, results, etc. associated with example embodiment 1600 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, operations performed as depicted in blocks 1601-1609 may be executed at computing platform 110, for example. Also, in embodiments, operations executed at computing platform 110 may include obtaining input from a user (e.g., system owner and/or a representative of a system owner) via an API, for example.

In an implementation, a system owner may obtain an installed firmware ROTPK from a key database, such as key database 520, for example, as indicated at block 1601. At block 1602, for example, a current system owner may tag a firmware ROTPK obtained from key database 520. Further, in an implementation, a current system owner may stage a signed content structure including a firmware ROPTK and a revocation tag value to a storage location accessible to a firmware management service, as indicated at block 1603. At block 1604, for example, a current system owner may transfer control of computing platform 110 to a firmware management service.

As indicated at block 1605, a firmware management service may verify the signed structure utilizing a current system owner's ROTPK (i.e., current platform ROTPK). Additionally, as indicated at block 1606, a firmware management service may verify that the owner of the firmware ROTPK to be revoked is not cryptographically associated with any currently active firmware. As indicated at block 1607 and/or block 1608, a successful verification may result in a firmware management service revoking an installed firmware ROTPK from key database 520, for example. As further indicated at block 1609, at least in part responsive to an unsuccessful verification operation, a firmware management service may return an error and/or may execute a recovery procedure, in an implementation.

Figure 17:
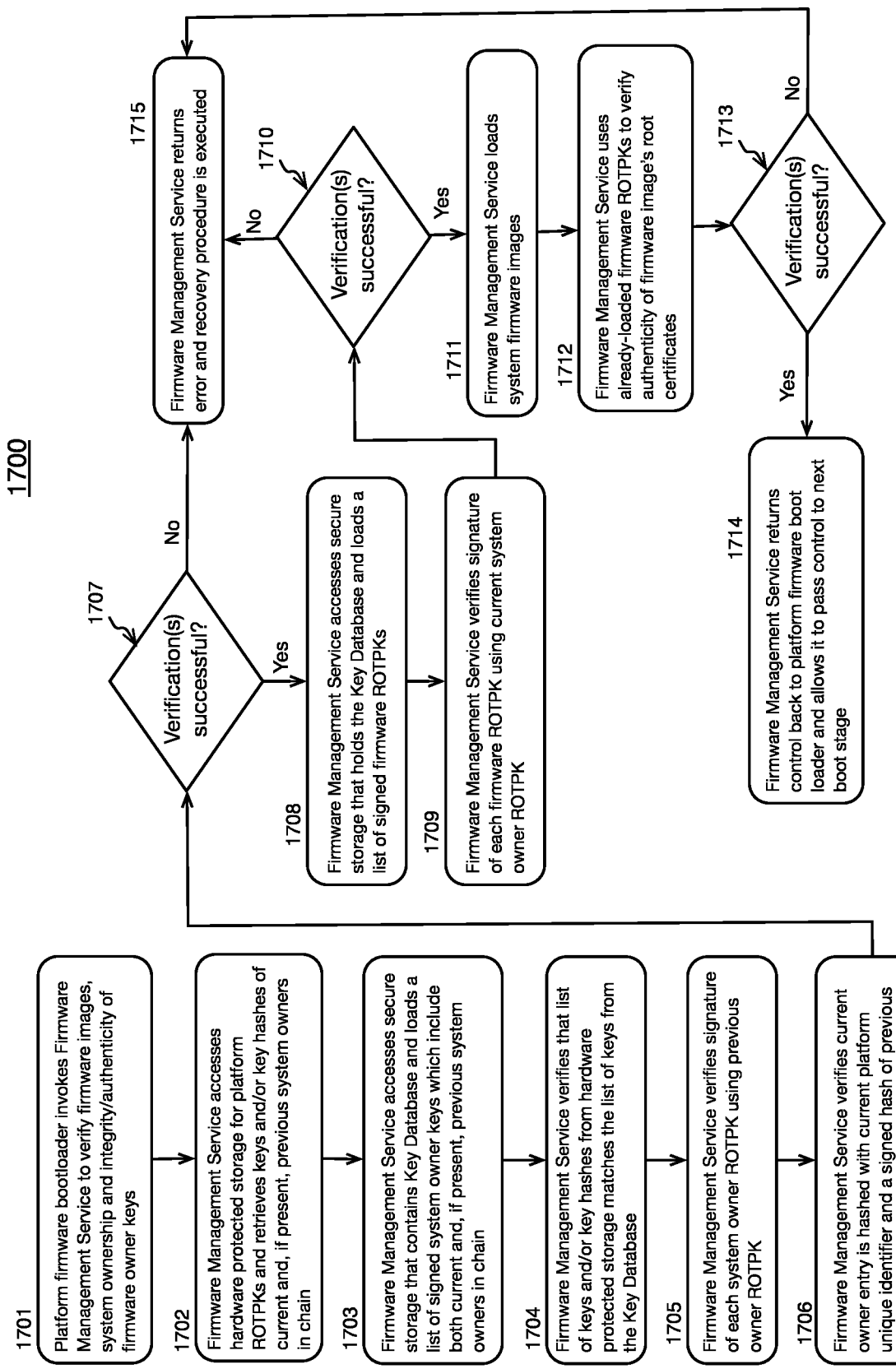
FIG. 17 is a flow diagram illustrating an example process for verifying system firmware during boot time for a computing device, in accordance with embodiments.

FIG. 17 is a flow diagram illustrating an embodiment 1700 of an example process for verifying system firmware during boot time for a computing device, such as computing platform 110. Embodiments in accordance with claimed subject matter may include all of blocks 1701-1715, fewer than blocks 1701-1715, and/or more than blocks 1701-1715. Likewise, it should be noted that content acquired or produced, such as, for example, input signals, output signals, operations, results, etc. associated with example embodiment 1700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, operations performed as depicted in blocks 1701-1715 may be executed at computing platform 110, for example. Also, in embodiments, operations executed at computing platform 110 may include obtaining input from a user (e.g., system owner and/or a representative of a system owner) via an API, for example.

In an implementation, a platform firmware bootloader service may invoke a firmware management service, such as may be executed at computing platform 110, for example, to verify firmware images, system ownership and/or integrity and/or authenticity of one or more firmware ROTPKs, as depicted at block 1701. Further, as indicated at block 1702, a firmware management service may access a hardware protected storage for a platform ROTPK and/or may also retrieve ROTPKs and/or ROTPK hashes for current and, if present, previous system owners in a chain of system owners, such as may be contained hardware protected storage 510, in an implementation. Additionally, as indicated at block 1703, a firmware management service may access a secure storage that may contain a key database, such as key database 520, and/or may load a list of signed system owner ROTPKs which may include both current and, if present, previous system owners in a chain.

As depicted at block 1704, for example, a firmware management service may verify that a list of ROTPKs and/or ROTPK hashes retrieved from hardware protected storage matches a list of ROTPKs obtained from a key database, such as key database 520. In an implementation, a firmware management service may verify signatures of individual system owner ROTPKs using previous owner ROTPKs, for example, as indicated at block 1705. Additionally, as indicated at block 1706, a firmware management service may verify that a current owner entry is hashed with current platform unique identifier and with a signed hash of a previous owner's key record, in an implementation.

As indicated at block 1707, for example, a determination may be made as to whether verification operations of blocks 1704, 1705 and/or 1706 have been successful. At least in part responsive to a determination that the verification operation(s) are successful, a firmware management service may access a secure storage that contains a key database, such as key database 520, and/or may load a list of signed firmware ROTPKs, as indicated at block 1708, for example. Further, as depicted at block 1709, a firmware management service may verify a signature of individual firmware ROTPKs using current system owner ROTPK (e.g., current platform ROTPK), for example.

As further indicated at block 1710, for example, an additional determination may be made as to whether one or more particular verification operations, such as indicated at block 1709, for example, have been successful. At least in part responsive to a determination of a successful verification, a firmware management service may load system firmware images, as indicated at block 1711, for example. Also, in a particular implementation, a firmware management service may utilize one or more already-loaded firmware ROTPKs to verify authenticity of one or more firmware images' root certificates, as depicted, for example, at block 1712.

In a particular implementation, at block 1713, for example, a further determination may be made as to whether a verification operation, such as the verification operation of block 1712, was successful. As further depicted at block 1714, a determination of a successful verification operation may result, at least in part, of a firmware management service returning control back to a platform firmware boot loader, for example, to allow the boot loader to pass control to a next boot loader stage, for example. Additionally, for any of the example verification operations depicted at blocks 1707, 1710, and/or 1713, a determination of an unsuccessful verification may result in a firmware management service returning an error and/or in executing a recovery procedure, for example.

Additional embodiments may be directed, at least in part, to delegation of firmware management authority and/or operations to clean up system security and/or sensitive content during system ownership changes. FIGS. 18-21 depict example implementations, and are more fully discussed below. Example implementations described below may be utilized, at least in part, as additions to and/or in conjunction with example implementations discussed above. However, subject matter is not limited in scope in this respect. For example, example implementations discussed below in connection with FIGS. 18-21 may be utilized separately from example implementations discussed above.

Figure 18:
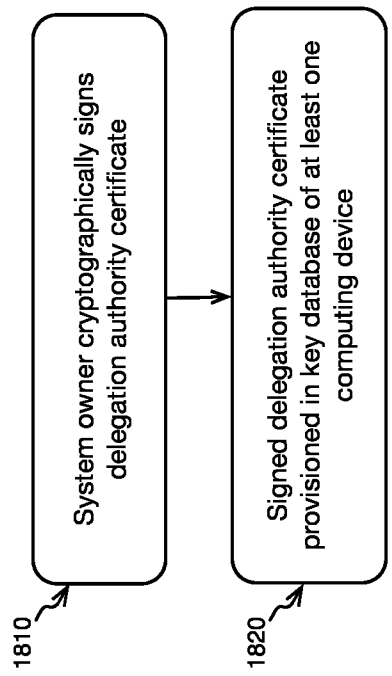
FIG. 18 is a flow diagram illustrating an example process for delegating cryptographic control of firmware authorization management for a computing platform from a system owner to a delegation authority, in accordance with embodiments.

FIG. 18 is a flow diagram illustrating an embodiment 1800 of an example process for delegating cryptographic control of firmware authorization management for a computing platform from a system owner to a delegate. Embodiments in accordance with claimed subject matter may include all of blocks 1810-1820, fewer than blocks 1810-1820, and/or more than blocks 1810-1820. Likewise, it should be noted that content acquired or produced, such as, for example, input signals, output signals, operations, results, etc. associated with example embodiment 1800 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. Also, in embodiments, operations executed at computing platform 110 may include obtaining input from a user (e.g., new system owner and/or a representative of a new system owner) via an API, for example. For example, a system owner may initiate delegation of cryptographic control of firmware authorization management for computing platform 110 to a delegate at least in part via interaction with an API executed at computing device 110.

"Delegate" and/or the like refers to an individual person, organization, representative, etc. who obtains a delegation authority certificate and/or the like (e.g., computing platform 110 specific content and/or content structures endorsed by a system owner and generated as part of an authorization package from a system owner). In an implementation, a delegate may be allowed to authorize new firmware owner ROTPK, revoke firmware owner ROTPK or modify firmware owner authorization parameters, or a combination thereof, for example. In an implementation, a delegate may be limited to operations and/or activities specified in a delegation authority certificate obtained from and/or signed by a system owner and/or via computing platform 110 specific content and/or content structures endorsed by a system owner and generated as part of an authorization package. For example, a system owner may delegate cryptographic control of firmware authorization management to another entity (e.g., delegate) by cryptographically signing a delegation authority certificate and/or provisioning the signed delegation authority certificate in a key database, such as key database 520, as explained more fully below.

Example advantages that may be realized by providing an ability to delegate cryptographic control of firmware authorization management for a computing platform from a system owner to another entity (e.g., delegate) may include allowing multiple entities to help manage the various tasks that may come with maintaining a computing system. This may yield advantages with respect to time management, security policies and/or utilization of expertise, familiarity, etc. of one or more individuals and/or groups of individuals with various aspects of system firmware, for example. Thus, for example, responsibility for maintaining system firmware may be shared among multiple entities while maintaining overall cryptographic control of the system with the system owner.

Also, for example, a system owner may wish to lease a computing system to another entity. The system owner may wish to allow the lessee to modify, replace, etc. at least some firmware while the system owner maintains overall cryptographic control. Of course, this is merely an example of how delegation of cryptographic control of firmware authorization management for a computing platform may be utilized, and subject matter is not limited in scope in this respect.

In an implementation, a delegate may, based at least in part on a signed delegation authority certificate signed by a system owner related to all or system owner-defined types of firmware, manage firmware ROTPK authorization, revocation and/or modification, for example. Delegation of cryptographic control of firmware authorization management may include, for example, managing firmware authorization properties, including, for example, managing authorization of boot loaders. In an implementation, a delegate may not be permitted to authorize a firmware management authority. For example, a delegate may not authorize another delegate, in an implementation. Further, in an implementation, a delegate may not be permitted to change system ownership, for example.

As depicted in block 1810, a system owner may cryptographically sign a delegation authority certificate. In an implementation, a delegation authority certificate and/or computing platform 110 specific content and/or content structures endorsed by a system owner and generated as part of an authorization package may specify particular permissions and/or authorities, for example, regarding provisioning of firmware that may be delegated to a delegate. For example, a system owner may restrict the delegate to one or more specific types of firmware at least in part by provisioning the specified permissions and/or authorities as part of a delegation content structure. In an implementation, a delegation content structure may specify one or more firmware types that may be authorized by a delegate. For example, a delegation content structure may include parameters permitting a delegate to authorize single types of firmware and/or multiple types of firmware (e.g., BL31, BL33, system processor, etc.). In another implementation, a delegation content structure may be included as an extension into a delegation authority certificate and/or may be provided as a separate content structure that may contain a reference to the delegation authority certificate. For implementations utilizing a separate content structure that may contain a reference to a delegation authority certificate, the separate content structure may be cryptographically signed by a system owner, for example.

Additionally, as indicated at block 1820, a system owner may provision a signed delegation authority certificate in a key database, such as key database 520, of one or more computing devices. In an implementation, a system owner may authorize (e.g., via cryptographic signature) new delegation authority certificates. In an implementation a system owner may delegate firmware management authorization to one or more delegates. For example, multiple delegates may be assigned different permissions based at least in part on the contents of the respective delegation authority certificates.

In an implementation, a system owner may provision one or more delegation authority certificates to a key database, such as key database 520, as explained more fully below in connection with FIG. 19. A system owner may further, in an implementation, provision, modify and/or revoke delegate-specific firmware management permissions. Further, for example, a system owner may revoke one or more delegation authority certificates. In an implementation, a system owner may authorize new firmware owner ROTPK, may revoke firmware owner ROTPK and/or may modify firmware owner authorization parameters. For example, a system owner may authorize all new firmware owner ROTPK, may revoke all firmware owner ROTPK and/or may modify all firmware owner authorization parameters, although subject matter is not limited in this respect. Additionally, in an implementation, system owner-specified permissions (e.g., via delegation authority certificate) may include, for example, permitting a delegate to authorize new firmware owner ROTPK, to revoke firmware owner ROTPK and/or to modify firmware owner authorization parameters.

Figure 19:
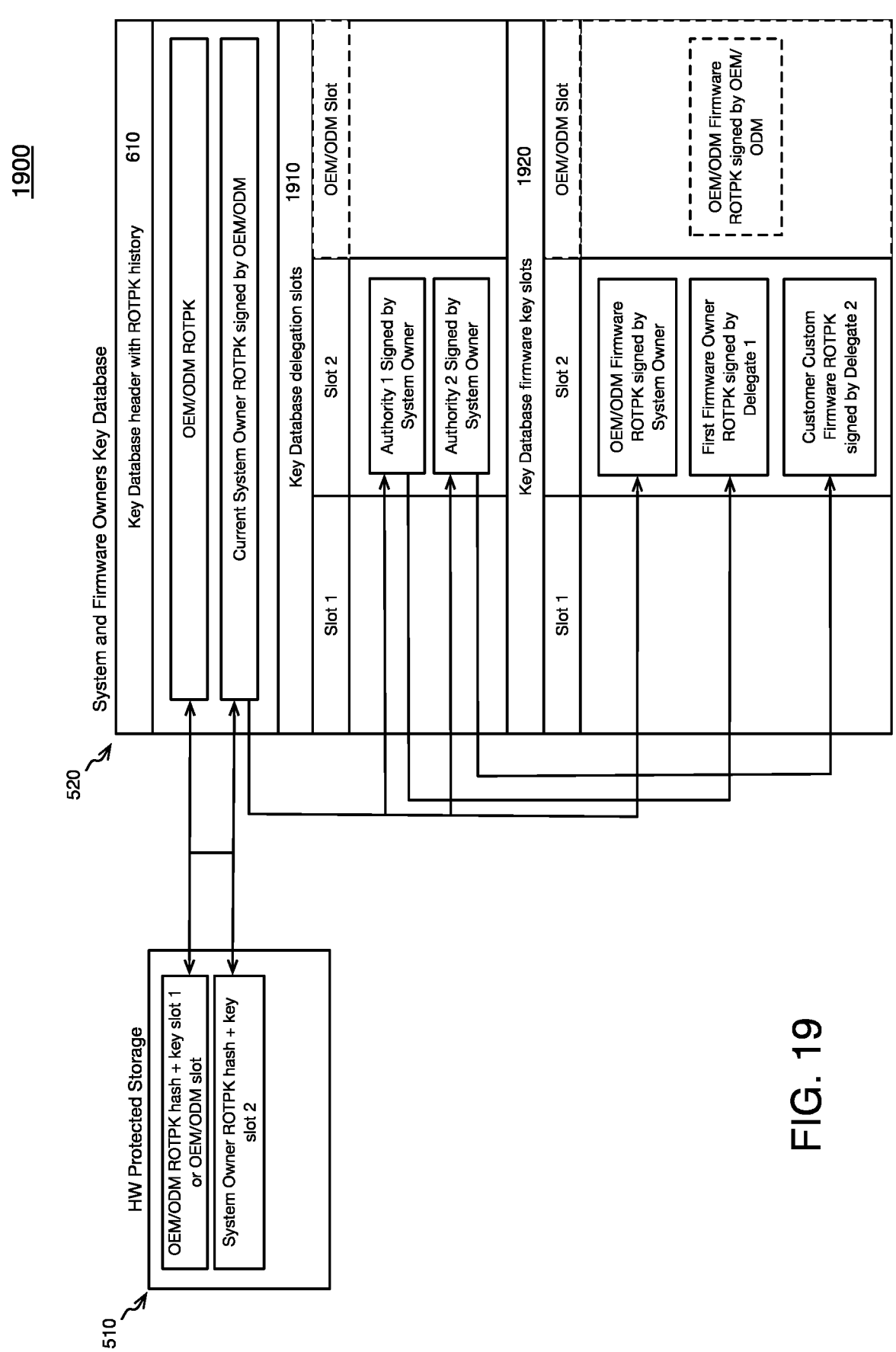
FIG. 19 depicts a schematic diagram illustrating an example system and firmware owners key database including delegation slots, in accordance with embodiments.

FIG. 19 depicts a schematic diagram illustrating an embodiment 1900 of an example system and firmware owners key database, (e.g., key database 520) including delegation slots, such as key delegation slots 1910. Example implementation 1900 may include some aspects that may be similar, at least in part, to example implementation 800 depicted in FIG. 8. For example, example 1900 may include a transfer of system ownership from a particular system ownership entity, such as an OEM/ODM, to a subsequent system ownership entity. In example 1900, the subsequent system ownership entity is labelled as a "current" system owner to indicate that an ownership/control transition from the particular system ownership entity (e.g., OEM/ODM) to the subsequent system ownership entity has occurred.

Example implementation 1900 additionally adds key database delegation slots 1910 to system and firmware owners key database 520. In an implementation key database delegation slots 1910 may include first and second slots corresponding to first and second slots of key database firmware key slots 1920. An additional slot may be added for OEM/ODM delegation authority certificates. Of course, the key database delegation slots 1910 depicted in implementation 1900 merely provide an example delegation slot configuration, and other implementations may utilize other configurations and/or numbers of delegation slots.

As discussed above (e.g., in connection with FIG. 9), a current system owner ROTPK may be provisioned to key database header with ROTPK history 610. As indicated in example 1900, a system owner may delegate firmware authorization authority to a delegate by signing and/or provisioning a delegation authority certificate and/or computing platform 110 specific content and/or content structures endorsed by a system owner and generated as part of an authorization package. For example, a current system owner may cryptographically sign one or more delegation authority certificates, such as Authority 1 and/or Authority 2. A current system owner may also provision the one or more delegation authority certificates to key database delegation slots 1910. For example, the current system owner may provision delegation authority certificates Authority 1 and/or Authority 2 to slot 2 of key database delegation slots 1910.

In an implementation, a first delegate may sign and/or may provision firmware owner 1 ROTPK to slot 2, for example, of key database firmware key slots 1920. As mentioned, the types of firmware that may be provisioned, revoked, modified, etc. may be specified in a delegation authority certificate, such as Authority 1. That is, for example, the types of activities that may be performed by a delegate may be restricted in accordance with the particular parameters of a particular signed delegation authority certificate, such as Authority 1 and/or Authority 2. As shown in example 1900, a current system owner has retained cryptographic control over OEM/ODM firmware as indicated by the OEM/ODM firmware ROTPK, signed by the system owner, provisioned to slot 2 of key database firmware key slots 1920. As additionally indicated in example 1900, a first delegate (e.g., Delegate 1) may cryptographically sign a first firmware owner ROTPK and may also provision the signed first firmware owner ROTPK to slot 2 of key database firmware key slots 1920. Similarly, for example, a second delegate (e.g., Delegate 2) may cryptographically sign a second firmware owner ROTPK and may also provision the signed second firmware owner ROTPK to slot 2 of key database firmware key slots 1920. As discussed above, a delegate may be restricted with respect to any of a variety of aspects of firmware management authorization depending on the particular parameters specified in the appropriate delegation authority certificate. Thus, for example, a delegate, such as Delegate 1, may cryptographically sign, provision, revoke, modify, etc. a particular firmware owner ROTPK based on a particular delegation authority certificate, such as Authority 1 provisioned to key database delegation slots 1910 by the current system owner.

As discussed above, a system owner may provision, modify and/or revoke delegate-specific firmware management permissions. For example, a system owner may revoke one or more delegation authority certificates. In an implementation, a system owner may authorize new firmware owner ROTPK, may revoke firmware owner ROTPK and/or may modify firmware owner authorization parameters. For example, a system owner may authorize all new firmware owner ROTPK, may revoke all firmware owner ROTPK and/or may modify all firmware owner authorization parameters, although subject matter is not limited in this respect. Additionally, in an implementation, a delegate may, if permitted by the system owner in accordance with a signed delegation authority certificate and/or via computing platform 110 specific content and/or content structures endorsed by a system owner and generated as part of an authorization package, authorize a firmware owner ROTPK, revoke a firmware owner ROTPK and/or modify firmware owner authorization parameters, for example.

Figure 20:
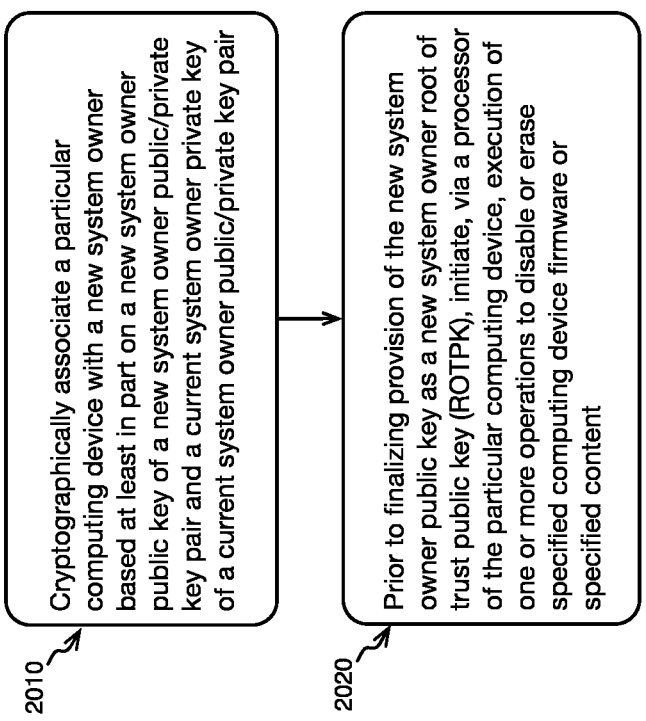
FIG. 20 is a flow diagram illustrating an example process for system ownership change, in accordance with embodiments.
Figure 21:
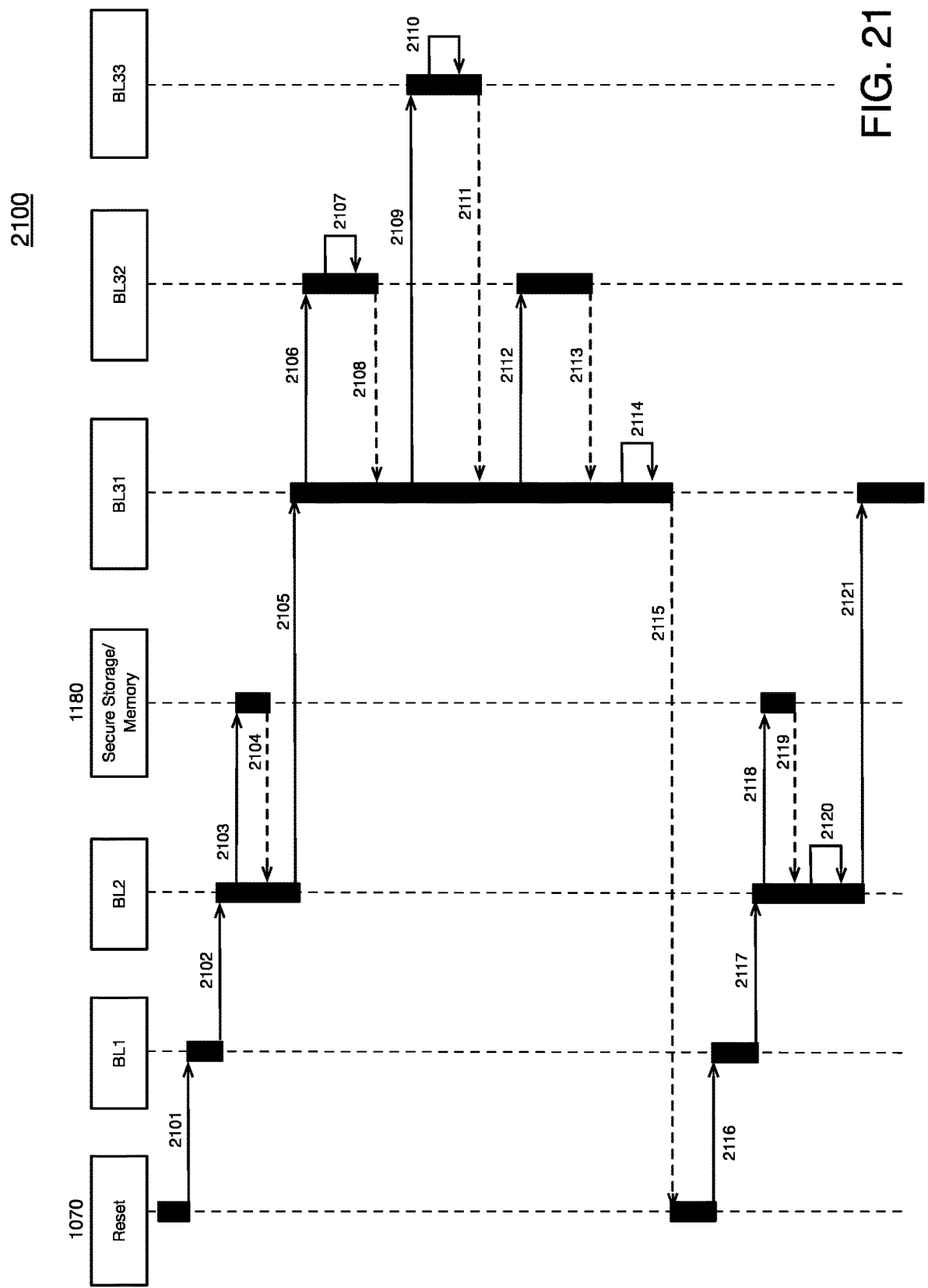
FIG. 21 depicts an example message flow diagram for an example process for system ownership change including intermediate event operations, in accordance with embodiments.

FIGS. 20 and 21, discussed below, may be directed, at least in part, to operations to clean up system security and/or sensitive content responsive at least in part to a particular system event, such as a system ownership change. For example, as part of system ownership change operations, firmware runtime services may perform operations to clean up (e.g., erase, overwrite, etc.) system security content and/or other sensitive content (e.g., private content). Firmware runtime services may also perform operations to reconfigure firmware and/or system software as part of an ownership change event, for example. Also, for example, firmware runtime services may also perform operations to reinitialize system services. Such clean-up operations performed as part of a system ownership transfer may allow a current system owner to remove, modify, delete, overwrite, etc. sensitive content such as, for example, cryptographic keys, proprietary content, private content, particular software applications, etc. before cryptographic control of the system is passed to a new owner. Further details are discussed below in connection with FIGS. 20 and 21.

FIG. 20 is a flow diagram illustrating an embodiment 2000 of an example process for system ownership change. Embodiments in accordance with claimed subject matter may include all of blocks 2010-2020, fewer than blocks 2010-2020, and/or more than blocks 2010-2020. Likewise, it should be noted that content acquired or produced, such as, for example, input signals, output signals, operations, results, etc. associated with example embodiment 2000 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. Also, in embodiments, operations executed at computing platform 110 may include obtaining input from a user (e.g., new system owner and/or a representative of a new system owner) via an API, for example. For example, system ownership change operations may be performed by computing platform 110 at least in part response to user interaction with an API executed at computing device 110.

As indicated at block 2010, a particular computing device, such as computing device 110, may be cryptographically associated with a new system owner based at least in part on a new system owner public key of a new system owner public/private key pair and/or a current system owner private key of a current system owner public/private key pair.

Further, as indicated at block 2020, prior to finalizing provision of a new system owner public key as a new system owner ROTPK, execution of one or more operations to disable or erase specified computing device firmware or specified content may be initiated. For example, a transition of system ownership (e.g., transfer of cryptographic control) may initiate an intermediate event to notify firmware and/or system software services about a transition to a new security state. In an implementation, an intermediate event may be generated by immutable firmware responsive at least in part to successful verification of the new system owner's certificate (e.g., ROTPK signed by previous owner) and/or successful verification of a firmware owner's authorization parameters.

In an implementation, a system ownership change event may be propagated to multiple (e.g., all) levels of firmware and/or system software. Further, for example, system firmware and/or software services may erase and/or otherwise secure (overwrite, move, etc.) security-sensitive content and/or private content. Additionally, in an implementation, system services specified to be proprietary may be disabled or erased, for example.

Further, in an implementation, following execution of operations to disable or erase specified computing device firmware or specified content initiated in response to a system owner change event, some system services, such a common system services, may be reinitialized. Additionally, for example, an existing delegation authority may be reset following execution of operations to disable or erase specified computing device firmware or specified content initiated in response to a system owner change event.

In an implementation, responsive at least in part to completion of system ownership operations by system firmware and/or software services, a system reset may be initiated by firmware and/or system services. For example, immutable firmware (e.g., boot loader BL2) may finalize system ownership transition responsive at least in part to successful execution of operations to disable or erase specified computing device firmware or specified content initiated in response to a system owner change event.

FIG. 21 depicts an example message flow 2100 for system ownership change including intermediate event operations, in accordance with embodiments. In an implementation, example message flow 2100 may comprise an extension and/or modification in at least some respects of example message flows 1100 and/or 1200, for example. Embodiments in accordance with claimed subject matter may include all of messages 2101-2121, fewer than messages 2101-2121, and/or more than messages 2101-2121. Likewise, it should be noted that content acquired or produced, such as, for example, input signals, output signals, operations, results, etc. associated with example message flow 2100 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, messages 2101-2121 may be communicated as one or more signals and/or signal packets among various software, firmware and/or hardware services executed at computing platform 110, for example.

In an implementation, as indicated by arrow 2101, a processor may begin executing from firmware boot loader stage BL1 at least in part in response to a system reset. In an implementation, boot loader stage BL1 may transfer control, as indicated by arrow 2102, to boot loader stage BL2. In an implementation, boot loader stage BL2 may check secure storage/memory 1180 for a state of system ownership change pending. As indicated by messages 2103 and 2104, boot loader stage BL2 may read a system ownership change pending state from secure storage/memory 1180.

Responsive at least in part responsive to a determination that a system ownership change state has been set within secure storage/memory 1180, BL2 may transfer control to boot loader stage BL31, as indicated by message 2105. For example, message 2105 may indicate to BL31 an ownership change event.

Additionally, in an implementation, BL31 may indicate an ownership change event to boot loader stage BL32 as indicated by message 2106. As represented by messages 2106, 2107 and/or 2108, control of execution of code for computing platform 110, for example, may be transferred to a trusted execution environment, including, for example, executing code from boot loader stage BL32. In an implementation, BL32 may include operations to clean secure, sensitive, private and/or proprietary content responsive at least in part to message 2106 indicating an ownership change event. For example, BL32 may erase, overwrite, remove, modify, etc. secure, sensitive, private and/or proprietary content.

Further, message 2109 may indicate an ownership change event to boot loader stage BL33. In an implementation, BL33 may be executed outside of a trusted execution environment. For example, as indicated by message 2110, execution of code from boot loader stage BL33 may result in content from non-secure world being cleaned (e.g., erase, overwrite, remove, modify, etc.). For example, BL33 may include operations to erase, overwrite, remove, modify, etc. configuration content, private content, proprietary content, etc.

In an implementation, BL33 may transfer control back to BL31 responsive at least in part to completion of operations to erase, overwrite, remove, modify, etc. configuration content, private content, proprietary content, etc., as indicated by message 2111. Further, message 2112 may signal to BL32 to disable trusted services if indicated. For example, trusted services may be license-protected services which may require a new license from a new system owner to be activated. Message 2113 may return control to BL31, in an implementation. Additionally, in an implementation, firmware and/or system software services may be reconfigured by BL31, as indicated by message 2114.

In an implementation, BL31 may also provide a system reset message 2115 to reset circuitry 1070. Reset circuitry 1070 may indicate via message 2116 to BL1 that a system reset has occurred. BL1 may pass control to BL2 via message 2117, for example. Further, in an implementation, BL2 may check secure storage/memory 1180 for a change of ownership state, as indicated by message 2118. In an implementation, BL2 may retrieve a state ready indication from secure storage/memory 1180 as indicated by message 2119.

Also, in an implementation, BL2 may finalize system ownership transition, as indicated by message 2120. For example, BL2 may finalize system ownership transition responsive at least in part to state ready message 2119. BL2 may also transfer control to BL31, for example, to complete example process 2100.

Following execution of operations to disable or erase specified computing device firmware or specified content initiated in response to a system owner change event, the new system owner may obtain cryptographic control of the system (e.g., computing device 110) but will not have access to previously cleaned content, as described above.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

A "signal measurement" and/or a "signal measurement vector" may be referred to respectively as a "random measurement" and/or a "random vector," such that the term "random" may be understood in context with respect to the fields of probability, random variables and/or stochastic processes. A random vector may be generated by having measurement signal components comprising one or more random variables. Random variables may comprise signal value measurements, which may, for example, be specified in a space of outcomes. Thus, in some contexts, a probability (e.g., likelihood) may be assigned to outcomes, as often may be used in connection with approaches employing probability and/or statistics. In other contexts, a random variable may be substantially in accordance with a measurement comprising a deterministic measurement value or, perhaps, an average measurement component plus random variation about a measurement average. The terms "measurement vector," "random vector," and/or "vector" are used throughout this document interchangeably. In an embodiment, a random vector, or portion thereof, comprising one or more measurement vectors may uniquely be associated with a distribution of scalar numerical values, such as random scalar numerical values (e.g., signal values and/or signal sample values), for example. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

Figure 22:
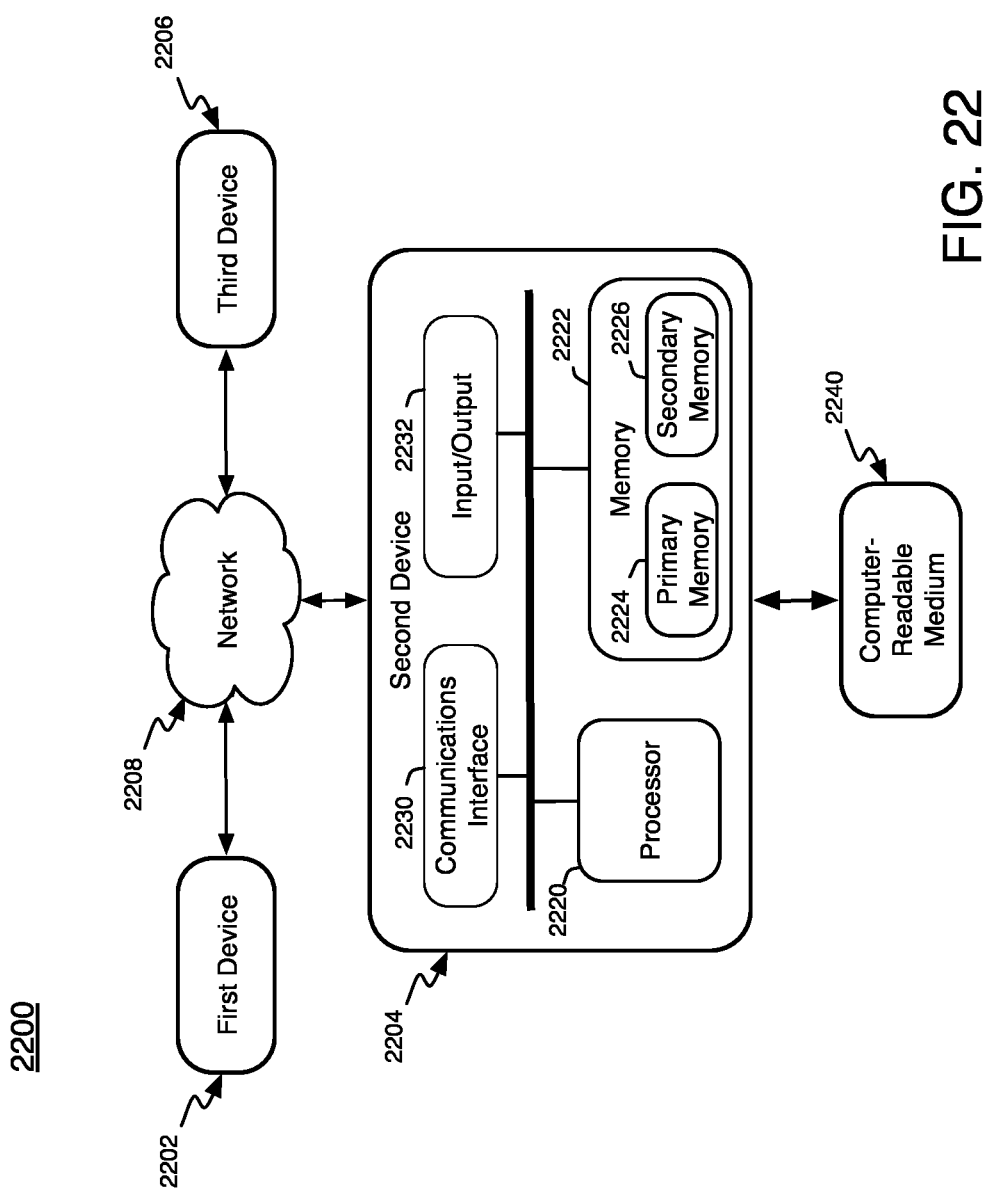
FIG. 22 is a schematic diagram illustrating an implementation of an example computing environment associated with processes to facilitate multi-party and/or delegated computing according to an embodiment.

In one example embodiment, as shown in FIG. 22, a system embodiment may comprise a local network (e.g., device 2204 and medium 2240) and/or another type of network, such as a computing and/or communications network. For purposes of illustration, therefore, FIG. 22 shows an embodiment 2200 of a system that may be employed to implement either type or both types of networks. Network 2208 may comprise one or more network connections, links, processes, services, applications, and/or resources to facilitate and/or support communications, such as an exchange of communication signals, for example, between a computing device, such as 2202, and another computing device, such as 2206, which may, for example, comprise one or more client computing devices and/or one or more server computing device. By way of example, but not limitation, network 2208 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 22 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended,—pursuant to that statutory section, that corresponding structure, material and/or acts for performing one or more functions be understood and be interpreted to be described at least in FIGS. 1-21 and in the text associated with the foregoing figure(s) of the present patent application.

Referring now to FIG. 22, in an embodiment, first and third devices 2202 and 2206 may be capable of rendering a graphical user interface (GUI) for a network device and/or a computing device, for example, so that a user-operator may engage in system use. Device 2204 may potentially serve a similar function in this illustration. Likewise, in FIG. 22, computing device 2202 ('first device' in figure) may interface with computing device 2204 ('second device' in figure), which may, for example, also comprise features of a client computing device and/or a server computing device, in an embodiment. Processor (e.g., processing device) 2220 and memory 2222, which may comprise primary memory 2224 and secondary memory 2226, may communicate by way of a communication bus 2215, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 2204, as depicted in FIG. 22, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 22, computing device 2202 may provide one or more sources of executable computer instructions in the form physical states and/or signals (e.g., stored in memory states), for example. Computing device 2202 may communicate with computing device 2204 by way of a network connection, such as via network 2208, for example. As previously mentioned, a connection, while physical, may not necessarily be tangible. Although computing device 2204 of FIG. 22 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 2222 may comprise any non-transitory storage mechanism. Memory 2222 may comprise, for example, primary memory 2224 and secondary memory 2226, additional memory circuits, mechanisms, or combinations thereof may be used. Memory 2222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 2222 may be utilized to store a program of executable computer instructions. For example, processor 2220 may fetch executable instructions from memory and proceed to execute the fetched instructions. Memory 2222 may also comprise a memory controller for accessing device readable-medium 2240 that may carry and/or make accessible digital content, which may include code, and/or instructions, for example, executable by processor 2220 and/or some other device, such as a controller, as one example, capable of executing computer instructions, for example. Under direction of processor 2220, a non-transitory memory, such as memory cells storing physical states (e.g., memory states), comprising, for example, a program of executable computer instructions, may be executed by processor 2220 and able to generate signals to be communicated via a network, for example, as previously described. Generated signals may also be stored in memory, also previously suggested.

Memory 2222 may store electronic files and/or electronic documents, such as relating to one or more users, and may also comprise a computer-readable medium that may carry and/or make accessible content, including code and/or instructions, for example, executable by processor 2220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 22, processor 2220 may comprise one or more circuits, such as digital circuits, to perform at least a portion of a computing procedure and/or process. By way of example, but not limitation, processor 2220 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 2220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 22 also illustrates device 2204 as including a component 2232 operable with input/output devices, for example, so that signals and/or states may be appropriately communicated between devices, such as device 2204 and an input device and/or device 2204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

Embodiments described herein are directed to cryptographically associating a particular computing device with a new system owner based at least in part on a new system owner public key of a new system owner public/private key pair and a current system owner private key of a current system owner public/private key pair. In a particular implementation, cryptographically associating the particular computing device with the new system owner may comprise, via the processor of the particular computing device, provisioning the new system owner public key as a new system owner root of trust public key (ROTPK). Also, for example, cryptographically associating the particular computing device with the new system owner may also comprises: transmitting the new system owner ROTPK from the particular computing device to a current system owner computing device for signature of the new system owner ROTPK using the current system owner private key; and obtaining a signed new system owner ROTPK from the current system owner computing device. In a particular implementation, cryptographically associating the particular computing device with the new system owner may further comprise: verifying the signed new system owner ROTPK against a current platform ROTPK; and storing the signed new system owner ROTPK in a secure non-volatile storage of the particular computing device.

In a particular implementation, the current platform ROTPK may comprise a current system owner public key of the current system owner public/private key pair, and the method may further comprise the processor of the particular computing device replacing the current system owner public key as the current platform ROTPK with the new system owner ROTPK as the current platform ROTPK. Also, for example, the processor of the particular computing device may establish cryptographic control of the particular computing device firmware in the new system owner, wherein the particular computing device firmware may comprise one or more firmware images cryptographically signed by one or more respective firmware owner ROTPKs under one or more respective signing domains. In a particular implementation, establishing cryptographic control of the particular computing device firmware in the new system owner may comprise the processor of the particular computing device: obtaining the one or more respective firmware owner's ROTPKs; and cryptographically signing the one or more respective firmware owner's ROTPKs with the new system owner private key. In a particular implementation, the one or more firmware images cryptographically signed by the one or more respective firmware owner ROTPKs under the one or more respective signing domains may comprise one or more firmware images cryptographically signed by one or more current firmware owner ROTPKs.

In a particular implementation, the processor of the particular computing device may: obtain a new firmware ROTPK from a new firmware owner computing device; and cryptographically sign the new firmware owner ROTPK with the new system owner private key. The processor of the particular computing device may also: verify the signed new firmware owner ROTPK against the new system owner ROTPK; and store the signed new firmware owner ROTPK in a key database in the secure storage of the particular computing device.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
cryptographically associating a particular computing device with a new system owner based at least in part on a new system owner public key of a new system owner public/private key pair and a current system owner private key of a current system owner public/private key pair, including:
prior to finalizing provision of the new system owner public key as a new system owner root of trust public key (ROTPK), initiating, via a processor of the particular computing device, execution of one or more operations to:
disable or erase specified computing device firmware or specified content, or a combination thereof, and
revoke a delegate's cryptographical control of firmware authorization management for the particular computing device, including revoking the delegate's permissions to authorize another party to modify the specified computing device firmware; and
responsive at least in part to successful execution of the one or more operations to disable or erase the specified computing device firmware or specified content, or the combination thereof, and further responsive at least in part to the revocation of the delegate's cryptographical control of firmware authorization management for the particular computing device, finalizing the provision of the new system owner public key as the new system owner ROTPK at least in part via execution of an immutable firmware bootloader;
wherein cryptographically associating the particular computing device with the new system owner further comprises:
transmitting the new system owner ROTPK from the particular computing device to a current system owner computing device for signature of the new system owner ROTPK using the current system owner private key;
obtaining a signed new system owner ROTPK from the current system owner computing device;
verifying the signed new system owner ROTPK against a current platform ROTPK; and
storing the signed new system owner ROTPK in a secure non-volatile storage of the particular computing device.

2. The method of claim 1, wherein the initiating the execution of the one or more operations to disable or erase specified computing device firmware or the specified content, or the combination thereof to occur following the obtaining the signed new system owner ROTPK.

3. The method of claim 1, wherein the initiating the execution of the one or more operations to disable or erase specified computing device firmware or the specified content, or the combination thereof to occur responsive at least in part to the storing the signed new system owner ROTPK in the secure non-volatile storage.

4. The method of claim 1, wherein the cryptographically associating the particular computing device with the new system owner further comprises:
detecting system ownership change pending state; and
responsive to detection of the system ownership change pending state, the processor to execute the one or more operations to disable or erase the specified computing device firmware or the specified content, or the combination thereof.

5. The method of claim 1, wherein the one or more operations to disable or erase the specified computing device firmware or the specified content, or the combination thereof includes processing secure-world content.

6. The method of claim 1, wherein the one or more operations to disable or erase the specified computing device firmware or the specified content, or the combination thereof includes processing non-secure-world content.

7. The method of claim 1, wherein the one or more operations to disable or erase the specified computing device firmware or the specified content, or the combination thereof includes disabling a trusted service.

8. The method of claim 1, wherein the one or more operations to disable or erase the specified computing device firmware or the specified content, or the combination thereof includes reconfiguring firmware services.

9. An apparatus, comprising: at least one processor comprising at least one execution circuit to:
cryptographically associate a particular computing device with a new system owner based at least in part on a new system owner public key of a new system owner public/private key pair and a current system owner private key of a current system owner public/private key pair, wherein the at least one processor to:
prior to finalizing provision of the new system owner public key as a new system owner root of trust public key (ROTPK), initiate execution of one or more operations to:
disable or erase specified computing device firmware or specified content, or a combination thereof, and
revoke a delegate's cryptographical control of firmware authorization management for the particular computing device, including revoking the delegate's permissions to authorize another party to modify the specified computing device firmware; and
responsive at least in part to successful execution of the one or more operations to disable or erase the specified computing device firmware or specified content, or the combination thereof, and further responsive at least in part to the revocation of the delegate's cryptographical control of firmware authorization management for the particular computing device, finalize the provision of the new system owner public key as the new system owner ROTPK at least in part via execution of an immutable firmware bootloader;
wherein, to cryptographically associate the particular computing device with the new system owner, the at least one processor is further to:
initiate transmission of the new system owner ROTPK from the particular computing device to a current system owner computing device for signature of the new system owner ROTPK using the current system owner private key;
obtain a signed new system owner ROTPK from the current system owner computing device;
verify the signed new system owner ROTPK against a current platform ROTPK; and
store the signed new system owner ROTPK in a secure non-volatile storage of the particular computing device.

10. The apparatus of claim 9, wherein the at least one processor to initiate the execution of the one or more operations to disable or erase specified computing device firmware or the specified content, or the combination thereof following the obtaining the signed new system owner ROTPK.

11. The apparatus of claim 9, wherein the at least one processor to initiate execution of the one or more operations to disable or erase specified computing device firmware or the specified content, or the combination thereof responsive at least in part to storage of the signed new system owner ROTPK in the secure non-volatile storage.

12. The apparatus of claim 9, wherein, to cryptographically associate the particular computing device with the new system owner, the at least one processor further to:
detect system ownership change pending state; and
responsive to detection of the system ownership change pending state, execute the one or more operations to disable or erase the specified computing device firmware or the specified content, or the combination thereof.

13. The apparatus of claim 9, wherein the one or more operations to disable or erase the specified computing device firmware or the specified content, or the combination thereof to include operations to process secure-world content and/or non-secure-world content.

14. The apparatus of claim 9, wherein the one or more operations to disable or erase the specified computing device firmware or the specified content, or the combination thereof to include disabling a trusted service and/or reconfiguring firmware services.

* * * * *